(12) United States Patent
Ogino

(10) Patent No.: US 11,982,931 B2
(45) Date of Patent: May 14, 2024

(54) LIGHT SOURCE DEVICE AND PROJECTOR

(71) Applicant: CASIO COMPUTER CO., LTD., Tokyo (JP)

(72) Inventor: Hiroshi Ogino, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 4 days.

(21) Appl. No.: 17/883,174

(22) Filed: Aug. 8, 2022

(65) Prior Publication Data
US 2023/0082282 A1    Mar. 16, 2023

(30) Foreign Application Priority Data

Sep. 14, 2021  (JP) ................................. 2021-149570

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01)

(58) Field of Classification Search
None
See application file for complete search history.

(56) References Cited

U.S. PATENT DOCUMENTS

| 11,019,312 B2 | 5/2021 | Masuda et al. |
| 2020/0257187 A1* | 8/2020 | Bartlett ................ H04N 9/3188 |
| 2022/0128893 A1* | 4/2022 | Hsieh ................... G03B 21/204 |

FOREIGN PATENT DOCUMENTS

| CN | 109188838 A | * 1/2019 | ............ G03B 21/20 |
| CN | 112114477 A | * 12/2020 | ........... G03B 21/204 |
| JP | 2015090432 A | 5/2015 | |
| JP | 2020160149 A | 10/2020 | |

* cited by examiner

*Primary Examiner* — Bao-Luan Q Le
*Assistant Examiner* — Danell L Owens
(74) *Attorney, Agent, or Firm* — Holtz, Holtz & Volek PC

(57) ABSTRACT

A light source device includes an excitation light irradiation unit that emits excitation light; a rotary wheel unit including a rotary wheel having a filter region that reflects or transmits light in a predetermined wavelength band different from a wavelength band of the excitation light and transmits the excitation light, and a transmission bending region that bends and transmits the excitation light; and a fixed phosphor that is irradiated with the excitation light transmitted through the filter region and emits fluorescence including light in the predetermined wavelength band toward the filter region. The rotary wheel unit is configured so that an optical axis of the excitation light that is transmitted through the rotary wheel or is reflected from the rotary wheel overlaps with an optical axis of the fluorescence in the predetermined wavelength band reflected from the filter region or transmitted through the filter region.

20 Claims, 19 Drawing Sheets

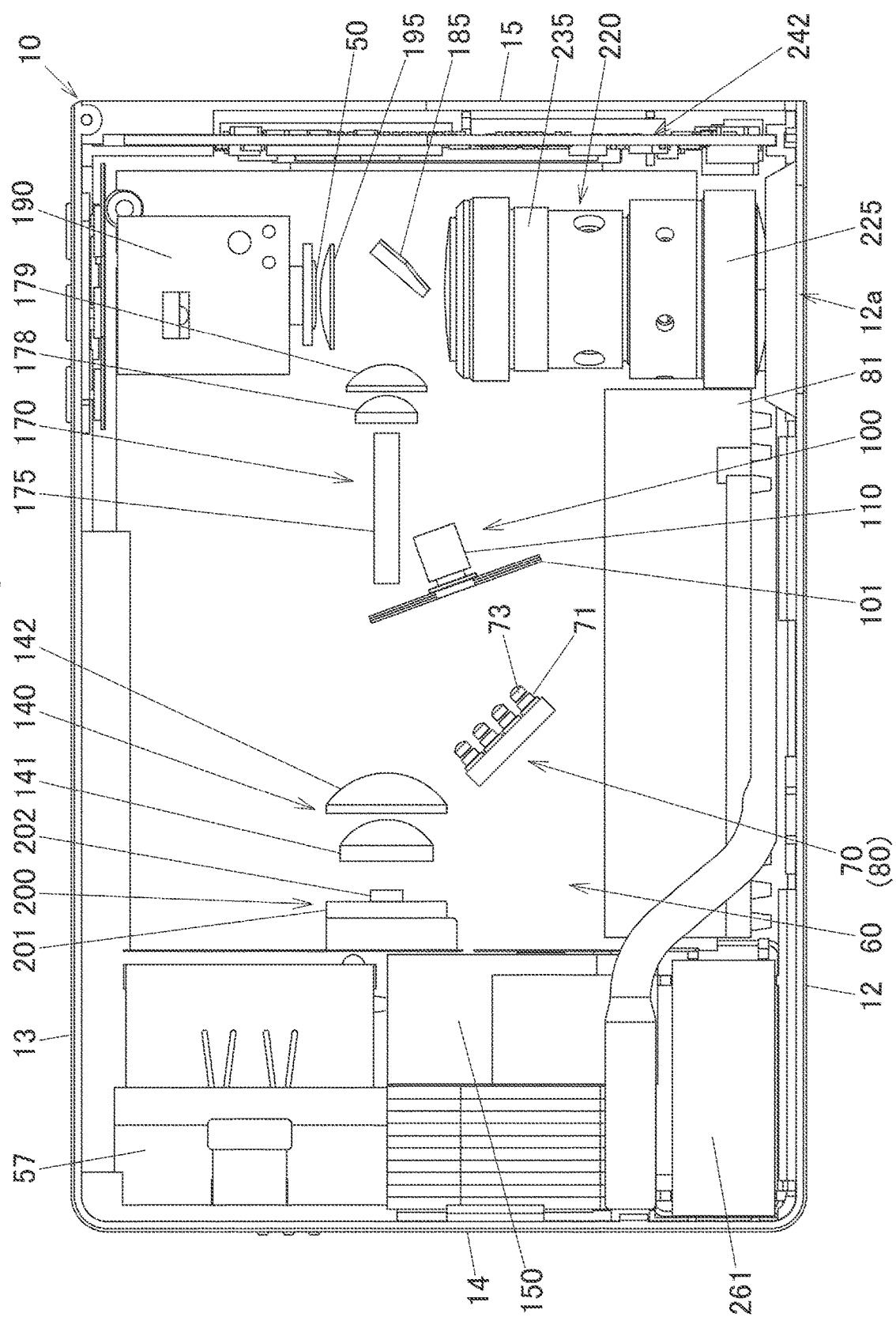

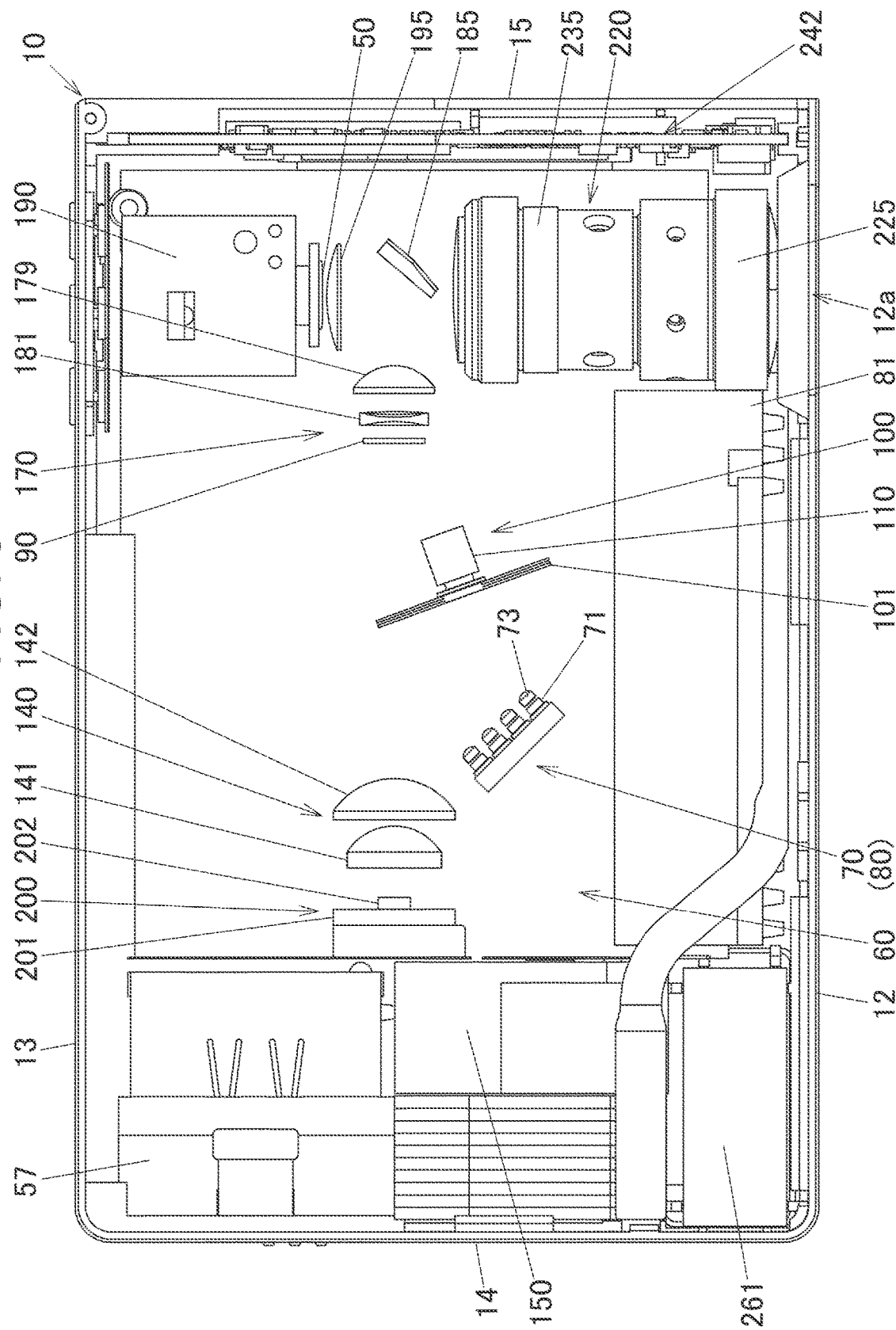

LIGHT SOURCE DEVICE AND PROJECTOR

CROSS-REFERENCE TO RELATED APPLICATIONS

This application is based upon and claims the benefit of priority of Japanese Patent Application No. 2021-149570 filed on Sep. 14, 2021, the entire disclosure of which is incorporated herein by reference in its entirety.

BACKGROUND

1. Field

The present disclosure relates to a light source device and a projector.

2. Related Art

Projectors are often used for projecting a screen or a video image of a personal computer and image data stored in a memory card on a screen. This projector is configured to collect light emitted from a light source to a micromirror display device called a digital micromirror device (DMD) or a liquid-crystal substrate, and display a color image on a screen.

For example, JP 2020-160149 discloses a light source device including a light source for blue wavelength band light (first wavelength band light), a fluorescence wheel, a dichroic mirror, a color wheel, and a controller. The color wheel includes a blue-red transmission region and an all-color transmission region. The blue-red transmission region is for selecting a red wavelength band light (second wavelength band light) and a part of green wavelength band light (third wavelength band light) on the long wavelength side that are combined through a dichroic mirror as fourth wavelength band light. The controller performs synchronization control on the fluorescence wheel and the color wheel, and shifts a synchronization position of the color wheel relative to the fluorescence wheel in accordance with an output mode.

The light source device in JP 2020-160149 includes the dichroic mirror separately placed in addition to the fluorescent wheel and color wheel. In this configuration, the optical path of the blue wavelength band light, which is the excitation light, may separate from the optical path of wavelength band light that is not the excitation light. In this case, the device may become larger, and color irregularities may occur due to errors resulting from the separate optical paths.

SUMMARY

A light source device according to the present disclosure includes: an excitation light irradiation unit that emits excitation light; a rotary wheel unit including a rotary wheel having a filter region that reflects or transmits light in a predetermined wavelength band different from a wavelength band of the excitation light and transmits the excitation light, and a transmission bending region that bends and transmits the excitation light; and a fluorescence emitting unit that is irradiated with the excitation light transmitted through the filter region and emits fluorescence including light in the predetermined wavelength band toward the filter region. The rotary wheel unit is configured so that an optical axis of the excitation light that is transmitted through the rotary wheel or is reflected from the rotary wheel overlaps with an optical axis of the fluorescence in the predetermined wavelength band reflected from the filter region or transmitted through the filter region.

A projector according to the present disclosure includes the light source device, a display device that generates image light, a projection optics that projects the image light emitted from the display device onto a projecting target, and a controller that controls the light source device and the display device.

BRIEF DESCRIPTION OF THE DRAWINGS

FIG. 2 is a schematic plan view showing the internal configuration of the projector according to the first embodiment.

FIG. 5 is a schematic plan view showing the internal configuration of the projector according to a modified example of the first embodiment.

FIG. 13A is a schematic plan view of the rotary wheel and FIG. 13B is a schematic cross-sectional view taken along XIIIb-XIIIb of FIG. 13A.

DETAILED DESCRIPTION

In view of these points, the present disclosure aims to provide a light source device capable of reducing color irregularities while having a compact size, and a projector including this light source device.

First Embodiment

Figure 1:
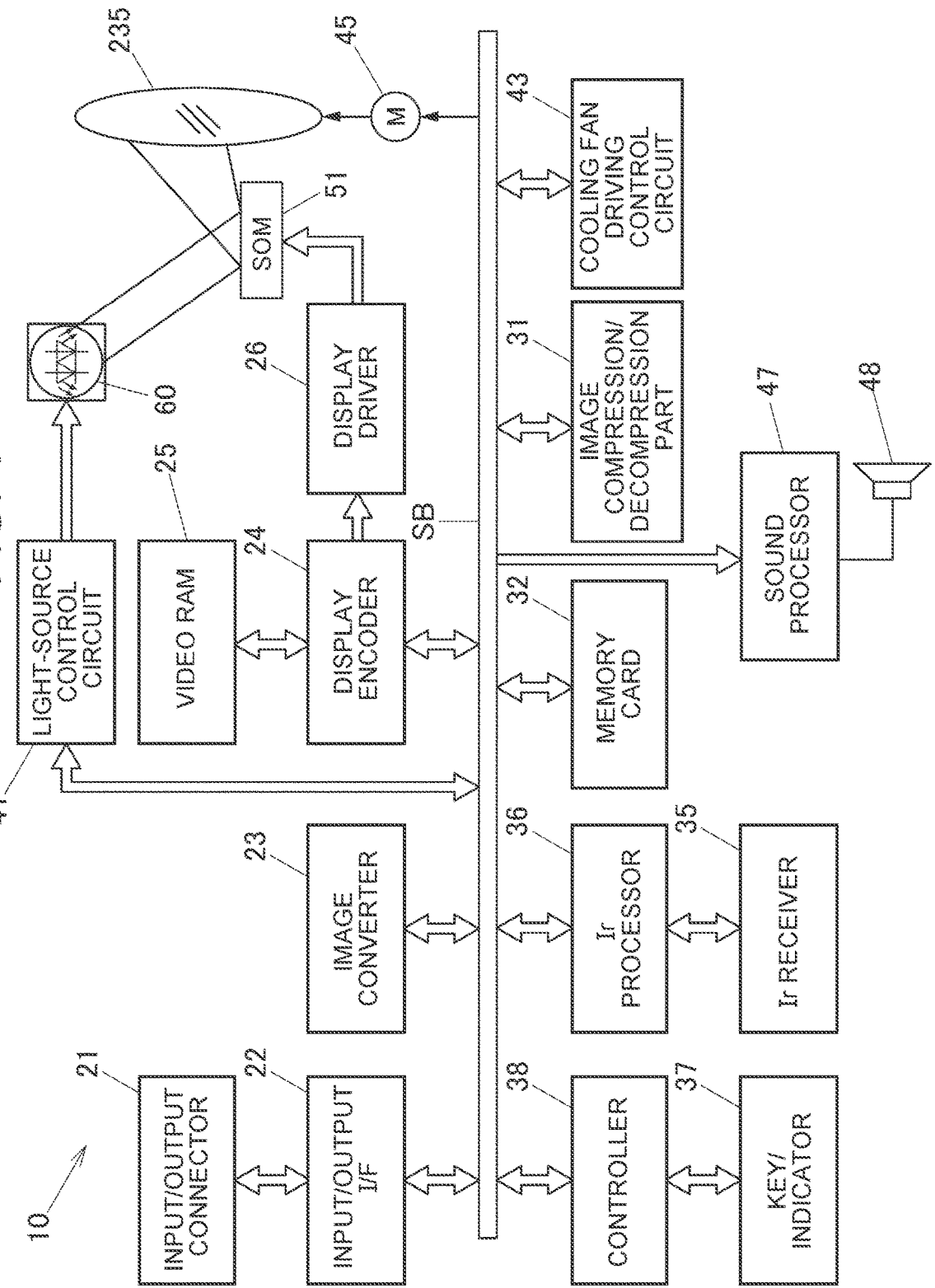
FIG. 1 is a functional circuit block diagram of a projector according to a first embodiment.

The following describes a first embodiment of the present disclosure, with reference to FIGS. 1 to 7. FIG. 1 is a functional circuit block diagram of a projector 10. A projector controller includes: a central processing unit (CPU) including an image converter 23 and a controller 38; a front end unit including an input/output interface 22; a display encoder 24; a display driver 26; and the like. Image signals of various formats input through an input/output connector 21 are transmitted to the image converter 23 via the input/output interface 22 and a system bus SB, to be converted into image signals of a predetermined common format suitable for display. Then, the image signals are output to the display encoder 24.

The display encoder 24 decompresses the input image signals and stores them in a video RAM 25. Then the display encoder 24 generates a video signal from the contents stored in this video RAM 25 and outputs the video signal to the display driver 26.

The display driver 26 drives a display device 50 that is a spatial optical modulator (SOM) at an appropriate frame rate corresponding to an image signal output from the display encoder 24. In one embodiment, the display device 50 is a digital micromirror device (DMD). The projector 10 irradiates the display device 50 with a light flux emitted from a light source device 60 via a light guiding optics, so as to form an optical image with the reflected light from the display device 50. The projector 10 then projects the formed optical image on a projecting target such as a screen (not shown) for display via a projection optics 220 (see FIG. 2). This projection optics 220 includes a movable lens group 235, and the movable lens group 235 is driven by a lens motor 45 for adjusting of zoom or focus.

An image compression/decompression part 31 compresses data that is a brightness signal and a color-difference signal of an image signal by data processing, such as ADCT or Huffman coding, and records the data successively in a memory card 32 that is a removable recording medium. In a reproduction mode, the image compression/decompression part 31 reads image data recorded in the memory card 32, decompresses individual image data making up a series of moving images in the unit of one frame, and outputs the image data to the display encoder 24 via the image converter 23. Thus, the image compression/decompression part 31 displays a movie or the like in accordance with the image data stored in the memory card 32.

The controller 38 controls the operation of various circuits in the projector 10, and includes a CPU, a ROM storing operation programs, such as various settings, in a fixed manner, a RAM used as a work memory, and the like.

A key/indicator 37 includes a main key and an indicator on the chassis. A manipulation signal from the key/indicator 37 is directly sent to the controller 38. A key manipulation signal from a remote controller is received at an Ir receiver 35, and is demodulated into a code signal at an Ir processor 36 to be output to the controller 38.

The controller 38 is connected to a sound processor 47 via the system bus SB. This sound processor 47 includes a sound source circuit, such as a PCM sound source, and converts sound data into analog data in the projection mode and the reproduction mode. Then, the sound processor 47 drives a speaker 48 to amplify and emit the sound.

The controller 38 controls a light-source control circuit 41. The light-source control circuit 41 controls an individual operation of an excitation light irradiation unit 70 and a rotation wheel unit 100 (see FIG. 2) of the light source device 60 so that light in a predetermined wavelength band required for creation of images is emitted from the light source device 60.

The controller 38 controls a cooling fan driving control circuit 43 to detect the temperature using a plurality of temperature sensors in the light source device 60 or the like, so as to control the rotating speed of a cooling fan 81 according to the result of the temperature detected. The controller 38 performs other controls of causing the cooling fan driving control circuit 43 to keep the cooling fan 81 rotating after turning-OFF of the power supply of the projector 10 using a timer, and turning off the projector 10 depending on the result of the temperature detection by the temperature sensors.

Next, the following describes the internal configuration of the projector 10. FIG. 2 is a schematic plan view showing the internal configuration of the projector 10. The chassis of the projector 10 has a substantially box shape, and has a top panel and a bottom panel (not shown), a front panel 12, a back panel 13, a right panel 14, and a left panel 15. In the following descriptions, left and right of the projector 10 indicate the left and right directions relative to the projection direction from a projection slot 12a, and back and forth indicate the back and forth direction in the direction toward the projecting target of the projector 10 or in the traveling direction of a light flux.

The projector 10 includes a control circuit board 242 in the vicinity of the left panel 15. This control circuit board 242 includes a power supply circuit block, a light source control block, and the like. The projector 10 also includes the light source device 60 located at a substantially central portion of the projector 10, a light source optics 170 located on the left of the light source device 60, and a projection optics 220 located between the light source optics 170 and the control circuit board 242.

The light source device 60 includes: the excitation light irradiation unit 70 that is a light source for the blue wavelength band light (first wavelength band light) and also serves as an excitation light source; a red-green light source unit 80 that is a light source for the red wavelength band light (third wavelength band light) and the green wavelength band light (fourth wavelength band light); the rotation wheel unit 100; and a fixed phosphor 200 (fluorescence emitting unit). The red-green light source unit 80 includes the excitation light irradiation unit 70, the rotary wheel unit 100, and the fixed phosphor 200. The light source device 60 includes: a light guiding optics 140 that guides the excitation light reflected from the rotary wheel unit 100 to the fixed phosphor 200 and guides the fluorescence emitted from a fluorescence emission region 202 of the fixed phosphor 200 to the rotary wheel unit 100; and a light source optics 170 that guides the light transmitted through the rotary wheel unit 100.

The excitation light irradiation unit 70 can be located at any position, and it is located at a position close to the front panel 12 near the center of the projector 10 in this embodiment. The excitation light irradiation unit 70 is held by a common holder, and includes a plurality of blue laser diodes 71 (excitation light sources) that are semiconductor light emitting devices, and collimator lenses 73. These blue laser diodes 71 are arranged in a matrix. A cooling fan 81 is placed between the front panel 12 and the blue laser diodes 71 to cool the blue laser diodes 71 and the rotary wheel unit 100.

Each of the collimator lenses 73 is positioned on the optical axis of the corresponding blue laser diode 71 and converts the light emitted from the blue laser diode 71 into parallel light for better directivity. Each collimator lens 73 is displaced toward the center blue laser diode 71 in the matrix from the optical axis of the corresponding blue laser diode 71. This arrangement of the collimator lenses 73 forms a light flux of the blue wavelength band light emitted from these blue laser diodes 71 that is restricted to a predetermined range. An optical member such as a collecting lens may be placed on the optical path between the collimator lenses 73 and the rotary wheel unit 100 so as to collect the blue wavelength band light emitted from these blue laser diodes 71 via the collimator lenses 73.

The present embodiment describes the example of placing the collimator lenses 73 on the optical axes of the blue laser diodes 71. In another embodiment, an optical fiber may be placed on the optical axis of each blue laser diode 71. In this case, the excitation light irradiation unit 70 further includes an optical fiber. The optical fiber has an incident part placed on the optical axis of a corresponding blue laser diode 71, and has an exit part directed toward the rotary wheel unit 100. When using the above optical fibers, the arrangement of the blue laser diodes 71 is not limited to that shown in FIG. 2. In one embodiment, the blue laser diodes 71 may be located outside the chassis of the projector 10. The present embodiment describes the example of placing the plurality of blue laser diodes 71. In another embodiment, a single blue laser diode 71 may be placed for a light source of excitation light. The excitation light source is not limited to the blue laser diodes, and any light source emitting the first wavelength band light may be used. In one embodiment, a blue light emitting diode (LED) may be used as the excitation light source.

Figure 3A:
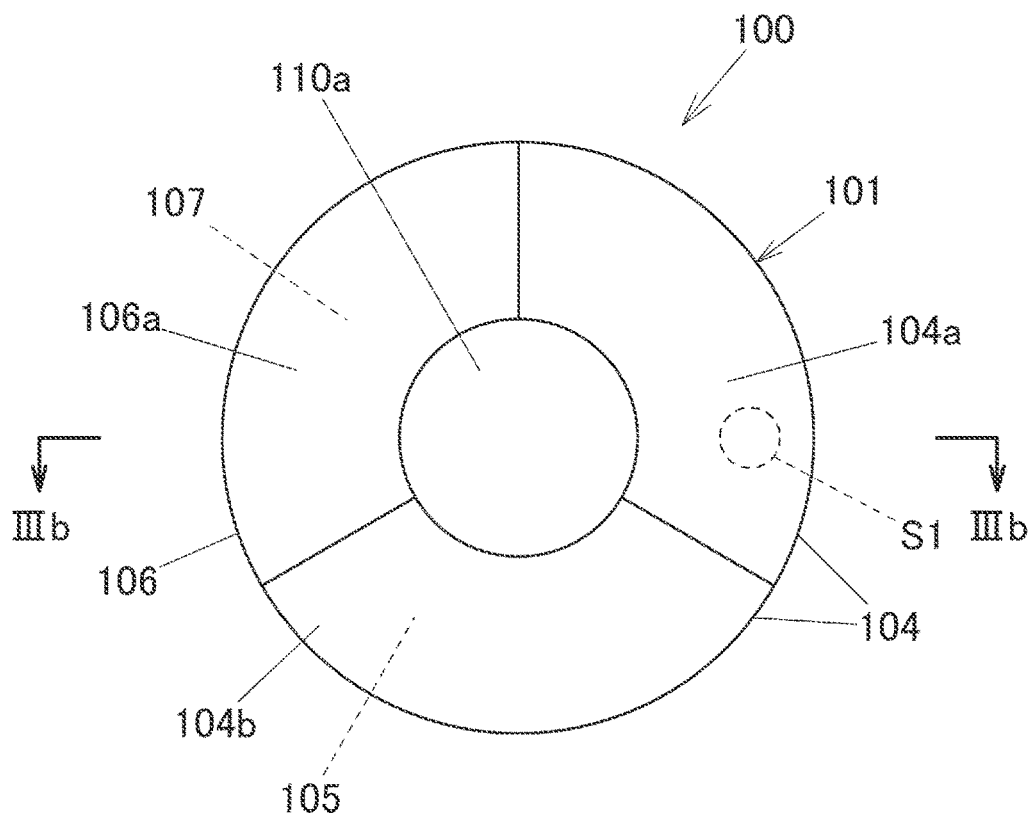
FIG. 3A is a schematic diagram of a rotary wheel unit according to the first embodiment, showing a planar schematic view of the rotary wheel.
Figure 3B:
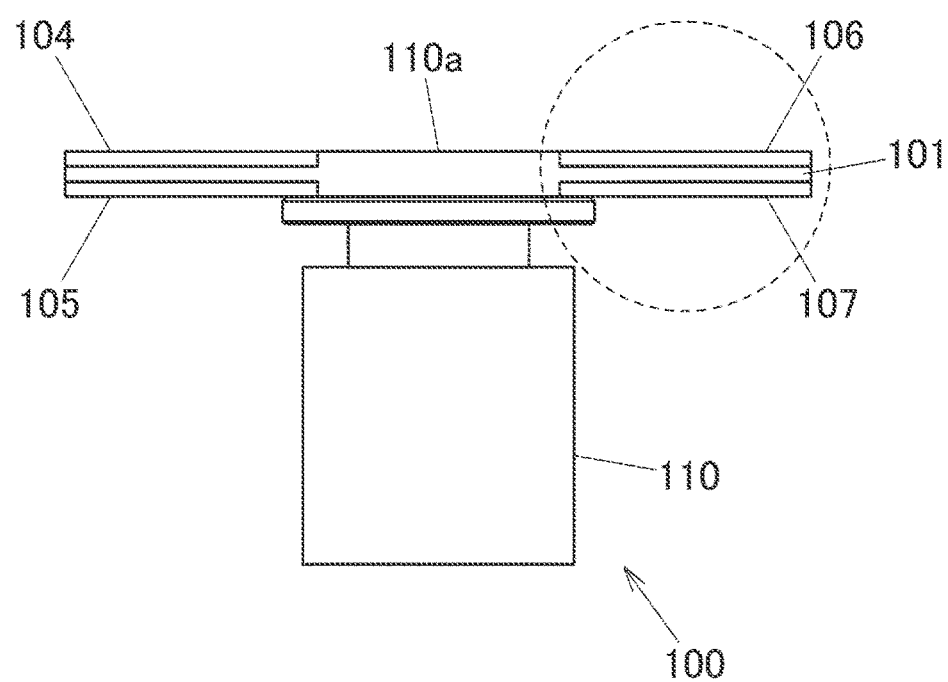
FIG. 3B is a schematic cross-sectional view taken along IIIb-IIIb of FIG. 3A.

The configuration of the rotary wheel unit 100 is described below. The rotary wheel unit 100 is located on the optical path of the excitation light emitted from the excitation light irradiation unit 70 and on the emission side of the collimator lenses 73. The rotary wheel unit 100 includes a rotary wheel 101 and a motor 110. As shown in FIGS. 3A and 3B, the rotary wheel 101 has a disk shape, the central portion thereof is pivotally supported by a motor shaft 110a of the motor 110, so that the rotary wheel 101 is rotary driven by the motor 110 around the motor shaft 110a. The rotary wheel 101 is placed at an angle inclined to the plane containing the fluorescence emission region 202 of the fixed phosphor 200 described below, so that the light emitted from the excitation light irradiation unit 70 enters the plate face (surface) of the rotary wheel 101 at an inclined angle. In the light source device 60, the excitation light irradiation unit 70 and the fixed phosphor 200 described below are placed toward the surface of the rotary wheel 101 (on the opposite side of the motor 110). In other words, the excitation light irradiation unit 70 and the fixed phosphor 200 are located on the same side of the rotating wheel 101, and the excitation light irradiation unit 70 and the fixed phosphor 200 (fluorescence emitting unit) are directed toward the plate face of the rotating wheel 101.

The rotary wheel 101 is a color wheel that is made of a transparent material such as glass or resin having transparency and has a filter region 104 and a transmission bending region 106. The filter region 104 includes a first filter region 104a and a second filter region 104b on one of the two plate faces of the rotary wheel 101 toward the excitation light irradiation unit 70. The transmission bending region 106 is in a different region from the filter region 104 on one (the surface) of the two plate faces of the rotary wheel 101 toward the excitation light irradiation unit 70. The first filter region 104a, the second filter region 104b, and the transmission bending region 106a are placed side by side in the circumferential direction of the rotary wheel 101. In the example shown in FIG. 3A, these regions are arranged in angular ranges of approximately 120 degrees. The ratio occupied by these first filter region 104a, second filter region 104b, and transmission bending region 106a is not limited to the angle ranges of approximately 120 degrees, and may be appropriately changed.

The first filter region 104a and the second filter region 104b in the filter region 104 are processed like a dichroic mirror, so as to transmit light in a part of the wavelength band of the fluorescence emitted from the fluorescence emission region 202 described later and reflect light in a predetermined wavelength band of excitation light and light in another part of the wavelength band of the fluorescence. Specifically, the first filter region 104a transmits green wavelength band light (fourth wavelength band light) and reflects blue wavelength band light (first wavelength band light) that is a wavelength band of excitation light and red wavelength band light (third wavelength band light). The second filter region 104b transmits red wavelength band light and reflects blue wavelength band light and green wavelength band light.

FIG. 3B is a schematic cross-sectional view of the rotary wheel 101. The rotary wheel 101 includes an excitation light reflecting region 105 in the region corresponding to the first filter region 104*a* and the second filter region 104*b* on the opposite face (opposite of the face toward the excitation light irradiation unit 70). The excitation light reflecting region 105 transmits light in wavelength bands other than the blue wavelength band, which is the wavelength band of excitation light, and reflects the blue wavelength band light.

Figure 4A:
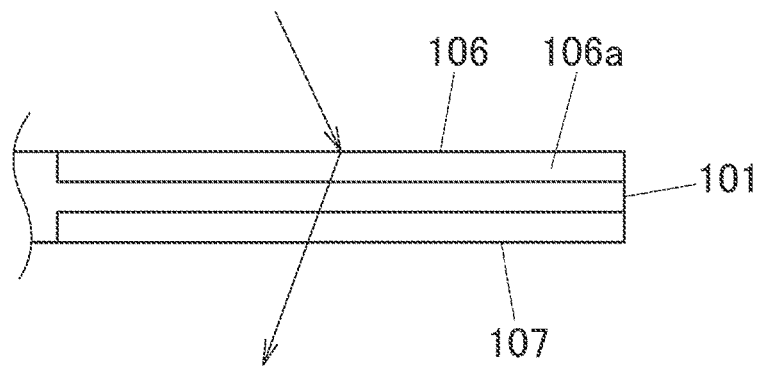
FIG. 4A is a schematic cross-sectional view of the rotary wheel unit, enlarging the part enclosed by the dashed line in FIG. 3B.

The transmission bending region 106 bends and transmits the blue wavelength band light, which is the wavelength band of excitation light. The blue wavelength band light incident on the transmission bending region 106 is refracted to be guided toward a light tunnel 175 described later. Specifically, the blue wavelength band light incident on the transmission bending region 106 is bent at an angle so that its optical axis overlaps with the light guiding direction of a light guiding optics 170 described below. As shown in FIG. 4A, the transmission bending region 106 in this embodiment has a transmission diffraction grating 106*a* (diffraction grating) that diffracts blue wavelength band light. The transmission grating 106*a*, which makes up the transmission bending region 106, can be easily formed by grooving the plate face of the rotary wheel 101. This transmission grating 106*a* guides the blue wavelength band light incident on the transmission bending region 106 in the optical path shown by the arrow in FIG. 4A. This transmission bending region 106 may have a diffusion property to diffuse blue wavelength band light if necessary.

Figure 4B:
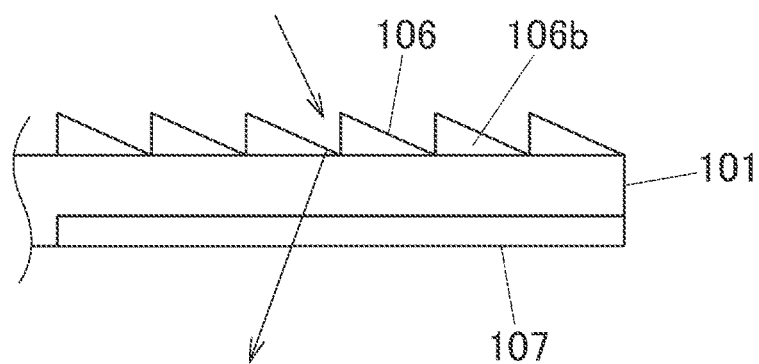
FIG. 4B is a schematic cross-sectional view according to a modified example of the part shown in FIG. 4A.
Figure 4C:
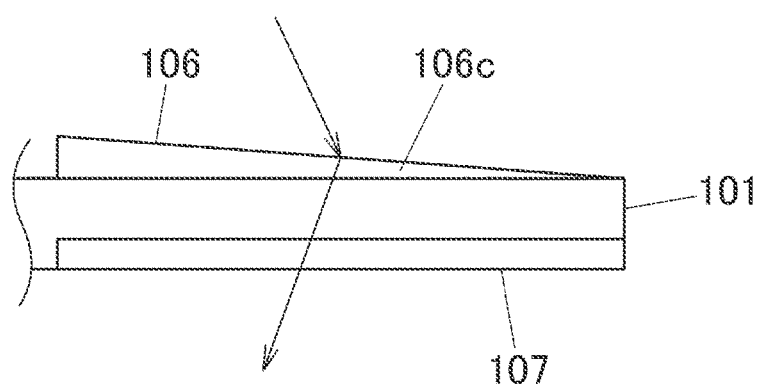
FIG. 4C is a schematic cross-sectional view according to another modified example of the part shown in FIG. 4A.

This embodiment describes the example of the transmission diffraction grating 106*a* formed in the transmission bending region 106. In another embodiment, as shown in FIG. 4B, the transmission bending region 106 may have a plurality of micro transmission refractive members 106*b*2 (refractive members) each having an inclined surface that refracts blue wavelength band light and arranged in a concentric pattern. As shown in FIG. 4C, the transmission bending region 106 may have a single transmission refractive member 106*c* with an inclined face that refracts blue wavelength band light. In these cases, the blue wavelength band light incident on the transmission bending region 106 is guided in the optical path shown by the arrows in FIGS. 4B and 4C. The transmission bending region 106 including the transmission refractive members 106*b*, 106*c* can be easily formed by placing the transmission refractive members 106*b*, 106*c* on the plate face of the rotary wheel 101.

The rotary wheel 101 includes a transmission diffusion region 107 in the region corresponding to the transmission bending region 106 on the opposite face (opposite of the face toward the excitation light irradiation unit 70). This transmission diffusion region 107 transmits and diffuses the blue wavelength band light transmitted through the transmission bending region 106. In one embodiment, the rotary wheel 101 may not have the transmission diffusion region 107. For example, the quality of an image projected onto the projecting target may be good without diffusing the blue wavelength band light by the rotary wheel 101. In this case, the rotary wheel 101 does not have to have the transmission diffusion region 107.

The rotary wheel unit 100 is configured so that the optical axis of the blue wavelength band light that is bent at the transmission bending region 106 and transmitted through the transmission bending region 106 overlaps with the optical axis of the fluorescence transmitted through the first filter region 104*a* or the second filter region 104*b*. That is, the rotary wheel unit 100 has the function of combining the blue wavelength band light transmitted through the transmission bending region 106 with the optical axis that is the same as that of the green and red wavelength band light transmitted through the filter region 104. Specifically, the excitation light irradiation unit 70, the rotary wheel unit 100, and the fixed phosphor 200 (fluorescence emitting unit) are placed so that the optical axis of the blue wavelength band light transmitted through the transmission bending region 106 overlaps with the optical axis of the fluorescence transmitted through the filter region 104.

Referring back to FIG. 2, the light guiding optics 140 includes a first collecting lens 141 (light guide member) and a second collecting lens 142 (light guide member). The first collecting lens 141 has a smaller diameter than the second collecting lens 142, and is placed between the second collecting lens 142 and the fixed phosphor 200. The first collecting lens 141 and second collecting lens 142 refract the light flux of the blue wavelength band light reflected from the filter region 104 of the rotary wheel unit 100 toward the fixed phosphor 200 and collect the light flux emitted from the fixed phosphor 200 toward the rotary wheel unit 100. Specifically, the light flux emitted from the fixed phosphor 200 toward the rotary wheel unit 100 is focused so as to be incident on the first filter region 104*a* or the second filter region 104*b* of the rotary wheel 101.

The fixed phosphor 200 includes a substrate 201 and the fluorescence emission region 202. The substrate 201 is made of a metal material such as copper or aluminum. The substrate 201 has a surface toward the rotary wheel unit 100, on which a flat reflective portion processed like a mirror by silver vapor deposition, for example, is formed. The fluorescence emission region 202 is located on the reflective part of the surface of the substrate 201. A heat sink 150 is located between the fixed phosphor 200 and the right panel 14 to cool the fixed phosphor 200.

The fluorescence emission region 202 includes a phosphor layer in which phosphor particles are dispersed. The phosphor particles are excited by the blue wavelength band light as excitation light applied to the fluorescence emission region 202, and emit fluorescence in the yellow wavelength band light (second wavelength band light). A part of the excitation light applied to the fluorescence emission region 202 excites the phosphor particles, whereby fluorescence is emitted from the fluorescence emission region 202, and the other part of the excitation light is reflected from the reflection part of the mirrored substrate 201 to excite the phosphor particles. A part of the excitation light reflected from the reflecting part of the substrate 201 does not excite the phosphor particles and is simply emitted from the fluorescence emission region 202. When the phosphor particles are excited, fluorescence is emitted in all directions, and a part of the fluorescence is simply emitted from the phosphor region 202 and the other part is reflected from the substrate 201 and emitted from the phosphor region 202.

The fluorescence in the yellow wavelength band emitted from the phosphor region 202 and incident on the filter region 104 of the rotary wheel unit 100 is separated by the filter region 104 into light in a predetermined wavelength band different from the wavelength band of the excitation light. Specifically, the fluorescence in the yellow wavelength band contains red wavelength band light and green wavelength band light. The first filter region 104*a* reflects the red wavelength band light for removal and extracts the green wavelength band light, and the second filter region 104*b* reflects the green wavelength band light for removal and extracts the red wavelength band light, and the extracted light is then transmitted through the rotary wheel 101.

This embodiment is configured so that the light source device 60 includes the red-green light source unit 80. In another embodiment, a red light source device emitting red wavelength band light may be provided separately, and the fluorescence emission region 202 of the fixed phosphor 200 may include a phosphor layer emitting fluorescence in the green wavelength band. In this case, the rotary wheel 101 of the rotary wheel unit 100 has, instead of the filter region 104, a filter region that reflects blue wavelength band light and transmits green wavelength band light, and a transmission bending region 106. A dichroic mirror, which transmits blue and green wavelength band light and reflects red wavelength band light, is placed between the light guiding optics 140 and the light tunnel 175. The red light source unit including a red light source having a semiconductor light emitting element such as a red light emitting diode is placed so that the red wavelength band light is emitted toward the dichroic mirror in the direction from the back panel 13 to the front panel 12. The red wavelength band light reflected from the dichroic mirror is incident on the light tunnel 175. Fluorescence in the green wavelength band light from the fixed phosphor 200 transmits through the filter region and the dichroic mirror and is incident on the light tunnel 175. The blue wavelength band light bent by and transmitted through the transmission bending region 106 passes through the dichroic mirror and is incident on the light tunnel 175.

The light source optics 170 includes the light tunnel 175 as a light guide member, a third collecting lens 178, a fourth collecting lens 179, an irradiation mirror 185, and a condenser lens 195. The condenser lens 195 is also part of the projection optics 220 because it emits the image light from the display device 50, which is located between the back panel 13 and the condenser lens 195, toward the projection optics 220.

The light tunnel 175, the third collecting lens 178, the fourth collecting lens 179, and the irradiation mirror 185 are located in this order on the optical axis of the rotary wheel unit 100 closer to the left panel 15. The light flux emitted from the emission port of the light tunnel 175 is collected by the third collecting lens 178 and the fourth collecting lens 179, and then is applied at a predetermined angle to the display device 50 via the condenser lens 195 by the irradiation mirror 185.

This embodiment describes the example of placing the light tunnel 175 as part of the light source optics 170. In another embodiment, a light guiding rod may be placed instead of the light tunnel 175. The light guiding rod used instead of the light tunnel 175 enables efficient guiding of light. In a modified example of the present embodiment, as shown in FIG. 5, a micro-lens array 90 may be placed instead of the light tunnel 175, and a concave lens 181 may be placed instead of the third collecting lens 178. The micro-lens array 90 saves space compared to the configuration including the light tunnel 175 or the like.

The projection optics 220 includes the condenser lens 195, a movable lens group 235, and a fixed lens group 225. The fixed lens group 225, which is located on the optical axis of the condenser lens 195 closer to the front panel 12, is built into a fixed lens barrel and is moved manually or automatically to allow zoom and focus adjustments.

Figure 6:
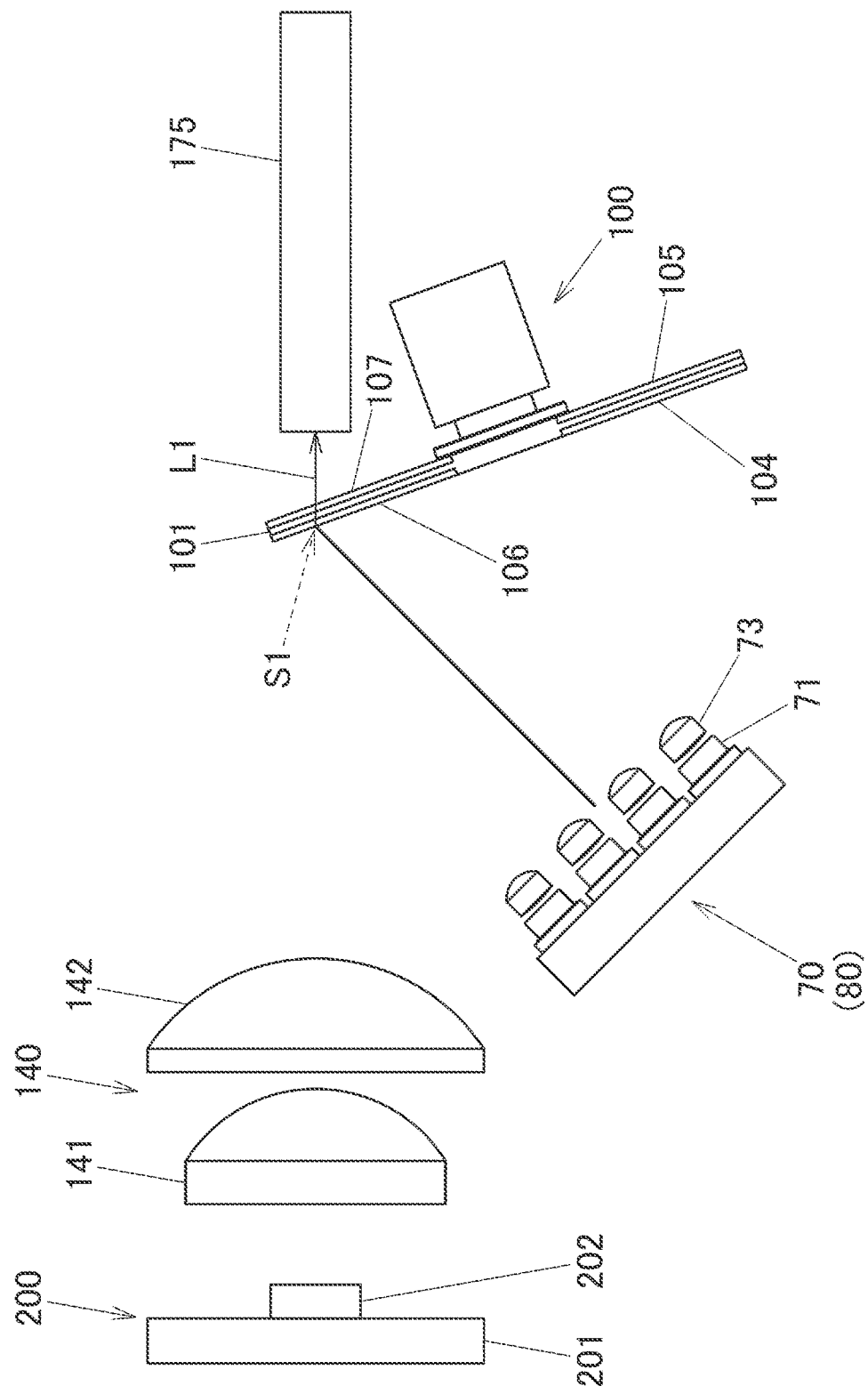
FIG. 6 is a schematic plan view showing how the excitation light applied to the rotary wheel unit of the first embodiment passes through the rotary wheel unit.

Next, the light coming in and out of the rotary wheel unit 100 will be described. Referring first to FIG. 6, the following describes the case in which blue wavelength band light, the excitation light, is emitted from the rotary wheel unit 100. In this drawing, the position on the rotary wheel 101 on which the excitation light (light L1 shown by the solid line in FIG. 6) is incident is defined as the irradiation spot S1 (see also FIG. 3A). In FIG. 6, the transmission bending region 106 of the rotary wheel 101 is located at the irradiation spot S1.

The excitation light emitted from the excitation light irradiation unit 70 is incident at an angle on the front plate face of the rotary wheel 101. While the transmission bending region 106 is located at the irradiation spot S1, the excitation light incident obliquely on the rotary wheel 101 enters the transmission bending region 106 of the rotary wheel 101. The excitation light incident on the transmission bending region 106 is bent toward the light tunnel 175 by the transmission bending region 106 while passing through the transmission bending region 106, and is further diffused in the transmission diffusion region 107 while passing through the transmission diffusion region 107, so as to be emitted toward the light tunnel 175. In this way, the excitation light, which is the blue wavelength band light, can be used as the light source light.

Figure 7:
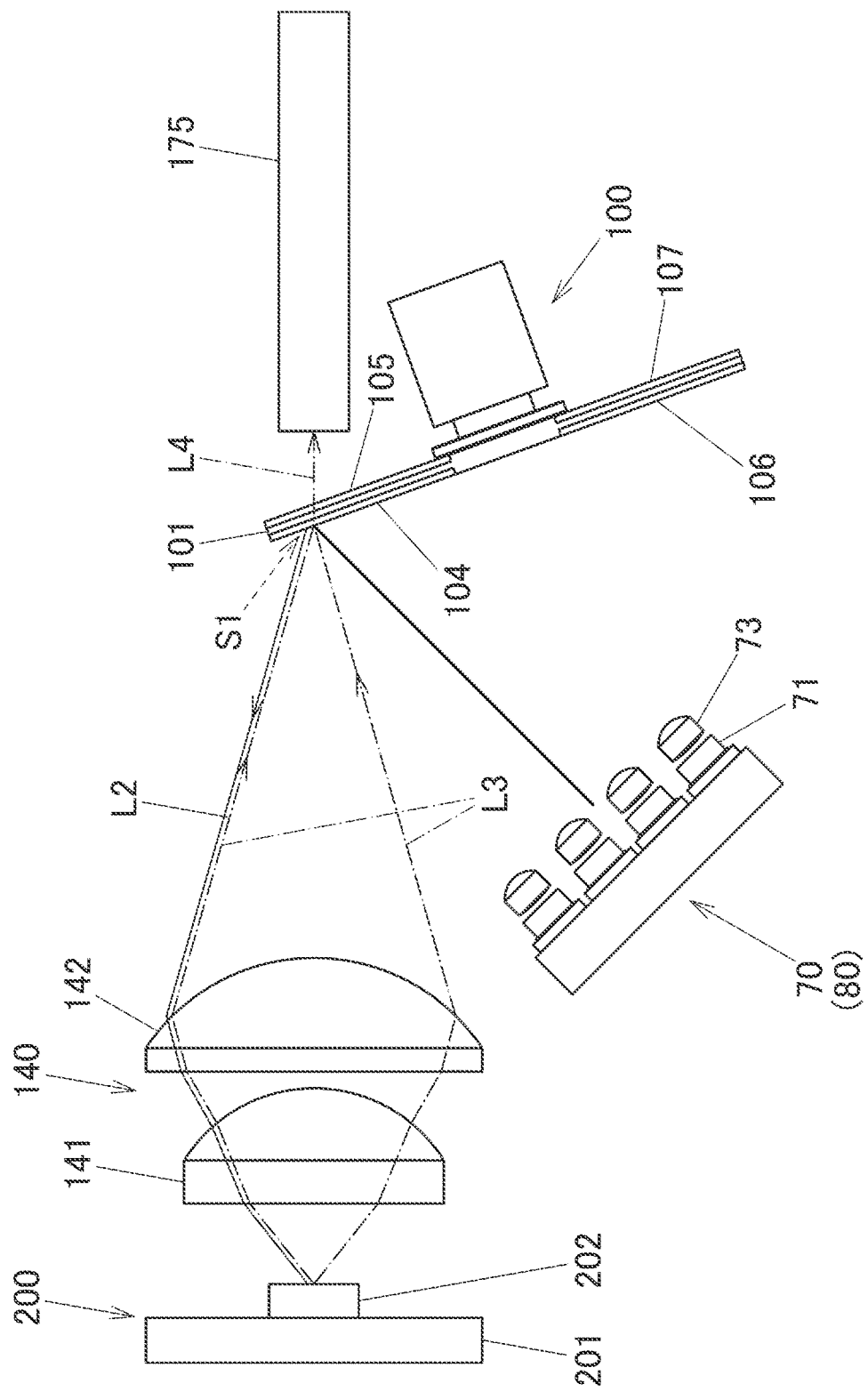
FIG. 7 is a schematic plan view showing how the excitation light applied to the rotary wheel unit of the first embodiment is reflected from the rotary wheel unit and is applied to the fluorescence emission region of the fluorescence emitting unit to emit fluorescence.

Referring next to FIG. 7, the following describes the case where green wavelength band light fluorescence is emitted from the rotary wheel unit 100 and the case where red wavelength band light fluorescence is emitted from the rotary wheel unit 100. In FIG. 7, the first filter region 104a or the second filter region 104b in the filter region 104 of the rotary wheel 101 is located at the irradiation spot S1.

The excitation light emitted from the excitation light irradiation unit 70, which is incident at an angle to the plate face (surface) of the rotary wheel 101, enters the first filter region 104a or the second filter region 104b in the filter region 104 of the rotary wheel 101. The excitation light incident on the filter region 104 is reflected from the filter region 104 toward the light guiding optics 140.

The excitation light (light L2 shown by solid line in FIG. 7) reflected toward the light guiding optics 140 enters the second collecting lens 142, and is refracted by the second collecting lens 142 and the first collecting lens 141 in this order for irradiation of the fluorescence emission region 202 of the fixed phosphor 200. The rotary wheel 101 in the light source device 60 is placed at an angle inclined to the plane containing the fluorescence emission region 202 of the fixed phosphor 200, so that the excitation light reflected from the filter region 104 can be collected by the first collecting lens 141 and second collecting lens 142. When the phosphor particles in the fluorescence emission region 202 are irradiated with the excitation light, fluorescence in the yellow wavelength band (light L3 shown by the dashed-dotted line in FIG. 7) is emitted in all directions. Note that the light emitted from the fluorescence emission region 202 contains fluorescence in the yellow wavelength band and excitation light reflected by the substrate 201 without being applied to the phosphor particles (hereinafter this excitation light is referred to as "residual excitation light"). Of the fluorescence and residual excitation light emitted from the phosphor region 202, part of the fluorescence and residual excitation light emitted toward the light source optics 140 is collected by the first collecting lens 141 and second collecting lens 142, and enters the rotary wheel 101.

When the first filter region 104a is located at the irradiation spot S1 of the rotary wheel 101, the first filter region 104a reflects the fluorescence in the red wavelength band of the fluorescence in the yellow wavelength band for removal, so that the fluorescence in the green wavelength band passes through the first filter region 104a. Part of the residual excitation light incident on the first filter region 104a is reflected from the first filter region 104a for removal. The residual excitation light that is not removed by the first filter region 104a and is transmitted there is then reflected from an excitation light reflecting region 105 for removal. Similarly, when the second filter region 104b is located at the irradiation spot S1, the second filter region 104b reflects the fluorescence in the green wavelength band of the fluorescence in the yellow wavelength band for removal, so that the fluorescence in the red wavelength band passes through the second filter region 104b. Part of the residual excitation light incident on the second filter region 104b is reflected from the second filter region 104b for removal. The residual excitation light that is not removed by the second filter region 104b and is transmitted there is then reflected from the excitation light reflecting region 105 for removal. In this way, the light passes through the excitation light reflecting region 105, whereby the residual excitation light has been almost removed from the obtained red wavelength band light and green wavelength band light (light L4 shown by the dashed-dotted line in FIG. 7). In one embodiment, the filter region 104 may not have the excitation light reflecting region 105. For example, if residual excitation light is removed to an acceptable level by the first filter region 104a and the second filter region 104b, the filter region 104 may not have the excitation light reflecting region 105.

The red wavelength band light and green wavelength band light transmitted through the filter region 104 are emitted toward the light tunnel 175. The optical paths of the red wavelength band light and green wavelength band light directed from the rotary wheel unit 100 to the light tunnel 175 are the same as the optical path of the excitation light directed from the rotary wheel unit 100 to the light tunnel 175. That is, the rotary wheel unit 100 is positioned at a location and angle such that the optical axis of the excitation light transmitted through the transmission bending region 106 overlaps with the optical axes of the red wavelength band light and green wavelength band light transmitted through the filter region 104.

As described above, the light source device 60 is configured so that the optical path of the blue wavelength band light, which is the excitation light, is the same as those of the red wavelength band light and the green wavelength band light that are different from the excitation light. With this configuration, this light source device has a reduced number of components compared with conventional light source devices that have separate optical paths for the excitation light and for the wavelength band light different from the excitation light. This makes the device smaller and more efficient. The light source device 60 suppresses color irregularities caused by errors due to separate optical paths for the excitation light and for the wavelength band light different from the excitation light. The rotary wheel 101 has the transmission bending region 106 that bends and transmits the excitation light. This eliminates a member for bending the excitation light, and thus makes the device smaller.

The light source device 60 is configured to emit the blue wavelength band light, which is excitation light, toward the light source optics 170 by bending the blue wavelength band light in the transmission bending region 106a of the rotary wheel unit 100. In this way, this light source device 60 guides the blue wavelength band light toward the light source optics 170 not via the fixed phosphor 200. With this configuration, the optical paths of the blue wavelength band light and fluorescence emitted from the fixed phosphor 200 do not overlap between the rotary wheel unit 100 and the fixed phosphor 200. This eliminates an additional structure, such as a color wheel, to emit the blue wavelength band light by spectroscopy, and makes the device smaller.

In the light source device 60, the excitation light irradiation unit 70 and the fixed phosphor 200 are placed toward the surface of the rotary wheel 101, i.e., on the opposite side of the motor 110. This makes the excitation light irradiation unit 70 and fixed phosphor 200 less susceptible to the heat generated from the motor 110, and allows the excitation light irradiation unit 70 and fixed phosphor 200 to efficiently dissipate heat, thus allowing the cooling fan in the light source device 60 to be smaller and reducing the size of the device.

The projector 10 includes the display device 50, which is irradiated with source light from the light source device 60 and generates image light, the projection optics 220 that projects the image light emitted from the display device 50 onto a projecting target such as a screen, and a controller that controls the light source device 60 and the display device 50. This enables the compact device 10 with high efficiency, which is capable of suppressing color irregularities.

Second Embodiment

Figure 8:
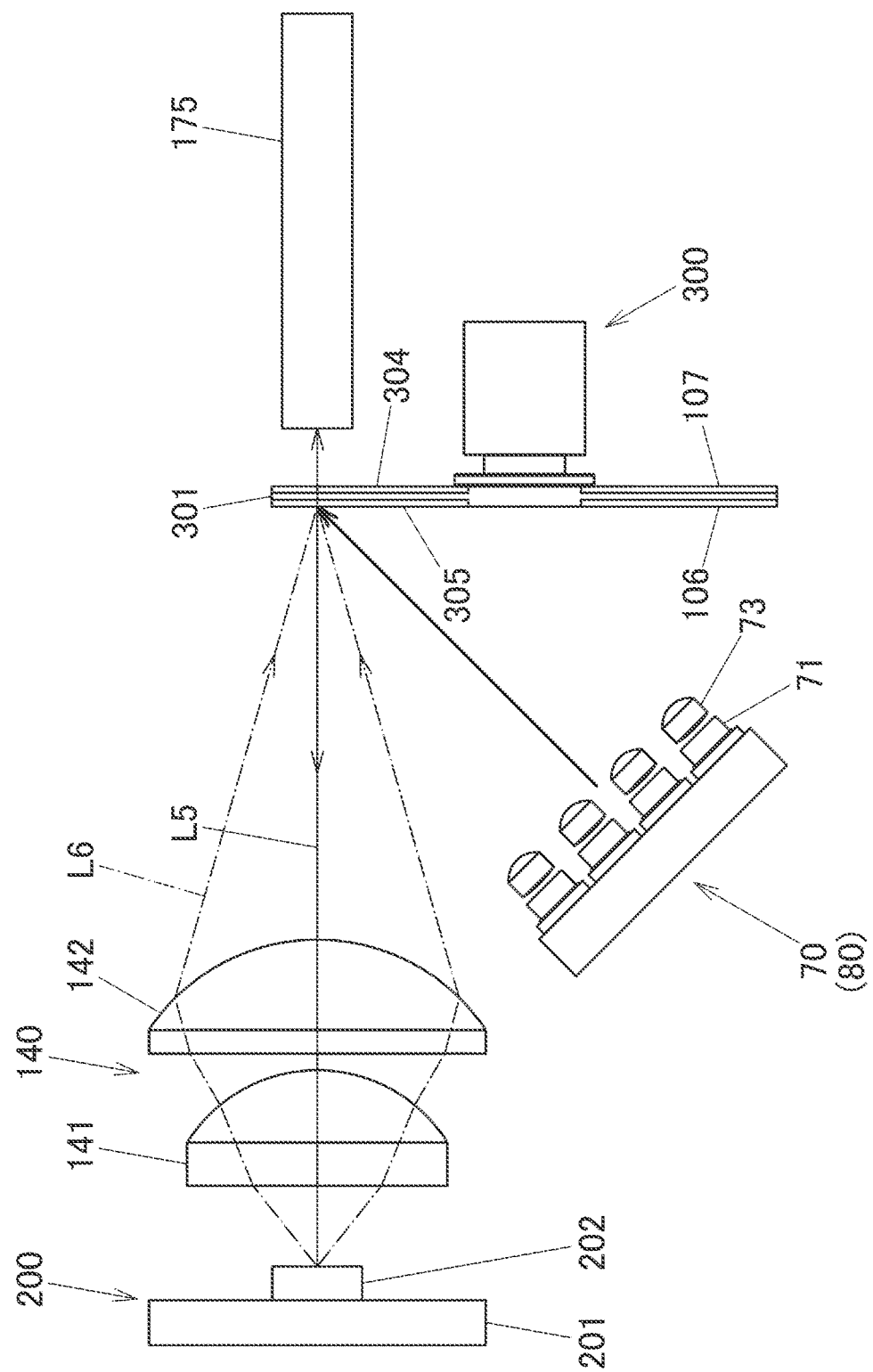
FIG. 8 is a schematic plan view showing how the excitation light applied to the rotary wheel unit of a second embodiment passes through the rotary wheel unit and how the excitation light applied to the rotary wheel unit is reflected from the rotary wheel unit and is applied to the fluorescence emission region of the fluorescence emitting unit to emit fluorescence.

The following describes a second embodiment of the present disclosure, with reference to FIGS. 8 to 9. In the description of the second embodiment, the descriptions are omitted or simplified for similar configuration to the first embodiment. The light source device according to the second embodiment includes a rotary wheel unit 300, and the rotary wheel unit 300 is placed so that its rotary wheel 301 is parallel to the face (face containing the fluorescence emission region 202) of the substrate 201 of the fixed phosphor 200 toward the rotary wheel unit 300.

The rotary wheel 301 has a filter region 304 that includes a first filter region and a second filter region on one of the two plate faces of the rotary wheel 301 on the opposite of the excitation light irradiation unit 70. These first and second filter regions, on the face opposite of the face toward the excitation light irradiation unit 70, are placed circumferentially side by side with a region (transmission diffusion region 107) corresponding to the transmission bending region 106 on the opposite face.

Figure 9A:
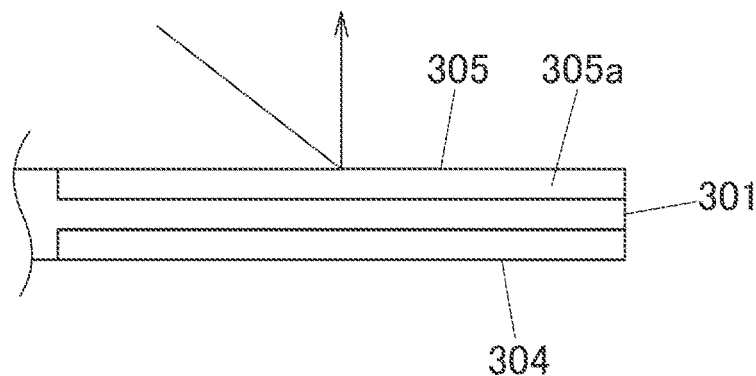
FIG. 9A is an enlarged schematic cross-sectional view of a reflection bending region of the rotary wheel unit.

The rotary wheel 301 has a reflection bending region 305 on one of the two plate faces of the rotary wheel 301 toward the excitation light irradiation unit 70 and at a region corresponding to the first filter region and the second filter region on the face opposite of these regions. The reflection bending region 305 reflects the blue wavelength band light, which is the excitation light incident obliquely on the plate face of the rotary wheel 301, in the direction normal to the plate face of the rotary wheel 301. This reflection bending region 305 has a dichroic coating, for example, to reflect blue wavelength band light and transmit light in wavelength bands other than the blue wavelength band. As shown in FIG. 9A, the reflection bending region 305 of the present embodiment includes a reflective grating 305a that reflects and refracts the blue wavelength band light in the direction normal to the plate face of the rotary wheel 301. The reflective grating 305a reflects the blue wavelength band light incident on the reflection bending region 305 in the optical path shown by the arrow in FIG. 9A. This reflection bending region 305 may have a diffusion property to diffuse blue wavelength band light if necessary.

Figure 9B:
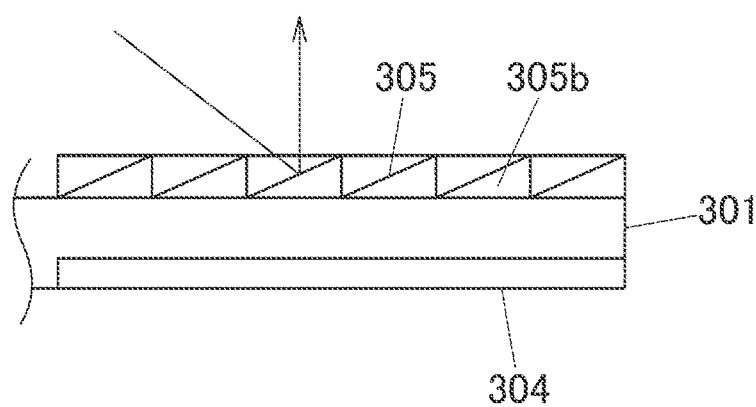
FIG. 9B is a schematic cross-sectional view of a modified example of the part shown in FIG. 9A.
Figure 9C:
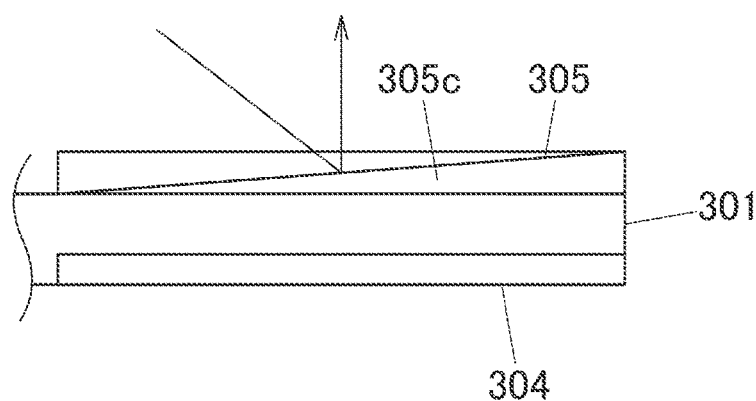
FIG. 9C is a schematic cross-sectional view of another modified example of the part shown in FIG. 9A.

This embodiment describes the example of the reflective grating 305a formed in the reflection bending region 305. In another embodiment, as shown in FIG. 9B, the reflection bending region 305 may have a plurality of micro reflection refractive members 305b (refractive members) each having an inclined surface that reflects blue wavelength band light at a predetermined angle. As shown in FIG. 9C, the reflection bending region 305 may have a single reflection refractive member 305c with an inclined face that reflects blue wavelength band light at a predetermined angle. In these cases, the predetermined angle is to reflect blue wavelength band light toward the light guiding optics 140, and the blue wavelength band light entering the reflection bending region 305 is reflected in the optical path shown by the arrows in FIG. 9B and FIG. 9C.

Referring next to FIG. 8, the following describes the light coming in and out of the rotary wheel unit 300 for the light source device in the second embodiment when green wavelength band light fluorescence is emitted from the rotary wheel unit 300 and when red wavelength band light fluorescence is emitted from the rotary wheel unit 300. The excitation light emitted from the excitation light irradiation unit 70, which is incident at an angle to the plate face of the rotary wheel 301, enters the reflection bending region 305 of the rotary wheel 301. The excitation light incident on the reflection bending region 305 is reflected from the reflection bending region 305 in the direction normal to the plate face of the rotary wheel 301 and heads toward the light guiding optics 140.

The excitation light (light L5 shown by solid line in FIG. 8) reflected toward the light guiding optics 140 enters the second collecting lens 142 and the first collecting lens 141 in this order so that its optical axis is along the optical axes of the first and second collecting lenses 141 and 142 for irradiation of the fluorescence emission region 202 of the fixed phosphor 200. The excitation light in this case irradiates the fluorescence emission region 202 perpendicular to the plate face of the substrate 201 of the fixed phosphor 200. The irradiation of the fluorescence emission region 202 with the excitation light causes emission of the fluorescence in the yellow wavelength band (light L6 indicated by the dashed-dotted line in FIG. 8) from the fluorescence emission region 202, and this fluorescence in the yellow wavelength band and the residual excitation light are collected by the first collecting lens 141 and second collecting lens 142, and enter the reflection bending region 305 of the rotary wheel 301. The rotary wheel 301 of the present embodiment is placed to be parallel to the face containing the fluorescence emission region 202 of the fluorescence emitting unit 200. This configuration also enables irradiation of the fluorescence emission region 202 with the excitation light reflected from the filter region 305 of the rotary wheel 301, and thus enables a simple design of the light source device 60 compared with the configuration of the rotary wheel 301 placed inclined to the fluorescence emission region 202.

Fluorescence incident on the reflection bending region 305 of the rotary wheel 301 passes through the reflection bending region 305, and enters the first filter region or the second filter region of the filter region 304, thus spectrally splitting into red or green wavelength band light and being emitted toward the light tunnel 175. The optical paths of the red wavelength band light and green wavelength band light from the rotary wheel unit 300 to the light tunnel 175 are the same as the optical path of the excitation light directed from the rotary wheel unit 300 to the light tunnel 175. That is, the rotary wheel unit 300 is positioned at a location and angle such that the optical axis of the excitation light transmitted through the transmission bending region 106 overlaps with the optical axes of the red wavelength band light and green wavelength band light transmitted through the filter region 304. Specifically, the excitation light irradiation unit 70, the rotary wheel unit 300, and the fixed phosphor 200 (fluorescence emitting unit) are placed so that the optical axis of the excitation light transmitted through the transmission bending region 106 overlaps with the optical axes of the red wavelength band light and green wavelength band light transmitted through the filter region 304.

In this way, the light source device according to the second embodiment also is configured so that the optical path of the blue wavelength band light, which is the excitation light, is the same as those of the red wavelength band light and the green wavelength band light that are different from the excitation light. With this configuration, this light source device has a reduced number of components compared with conventional light source devices that have separate optical paths for the excitation light and for the wavelength band light different from the excitation light. This enables a compact device with high efficiency, which is capable of suppressing color irregularities.

Third Embodiment

Figure 10:
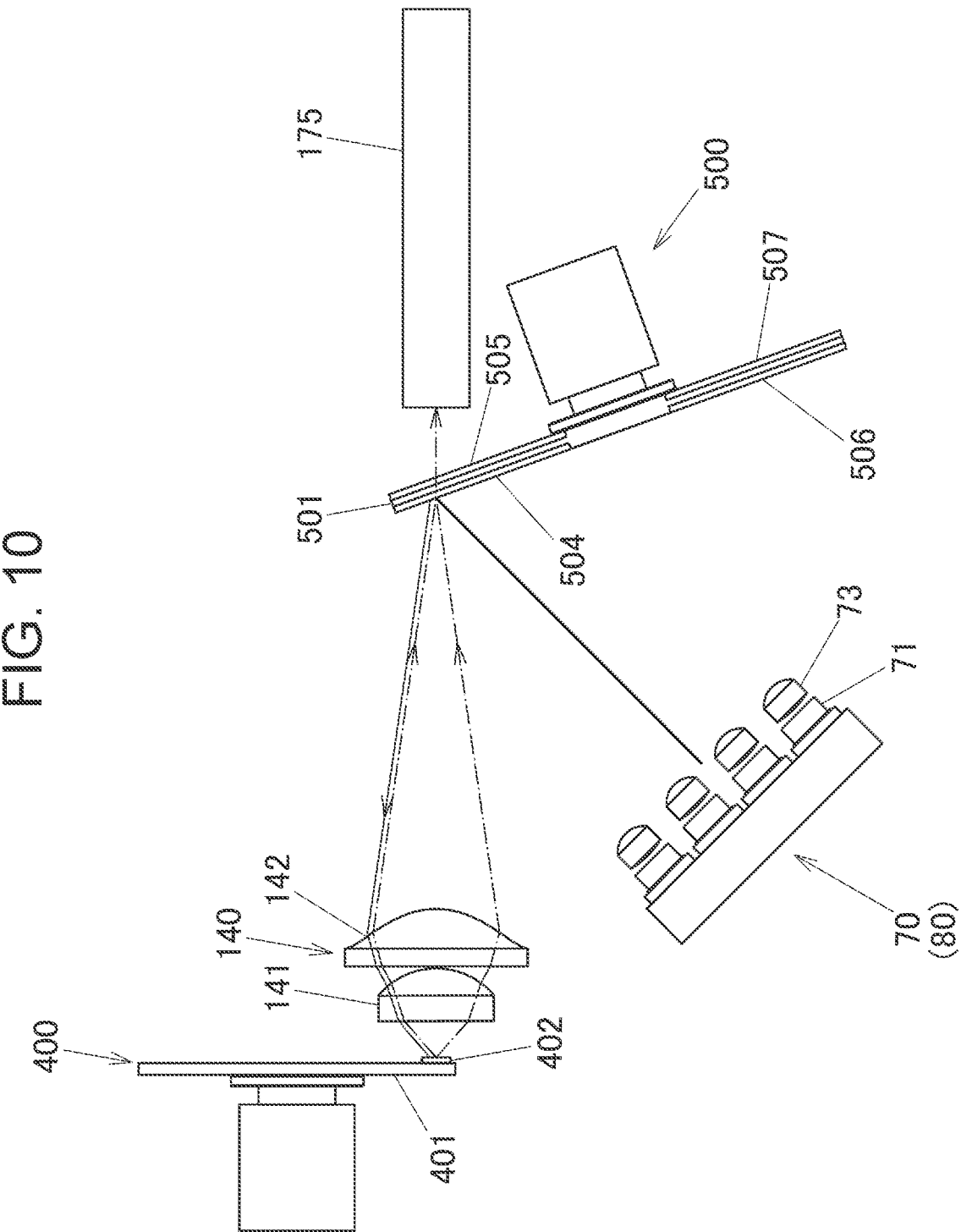
FIG. 10 is a schematic plan view showing how the excitation light applied to the rotary wheel unit of a third embodiment passes through the rotary wheel unit and how the excitation light applied to the rotary wheel unit is reflected from the rotary wheel unit and is applied to the fluorescence emission region of the fluorescence emitting unit to emit fluorescence.
Figure 11:
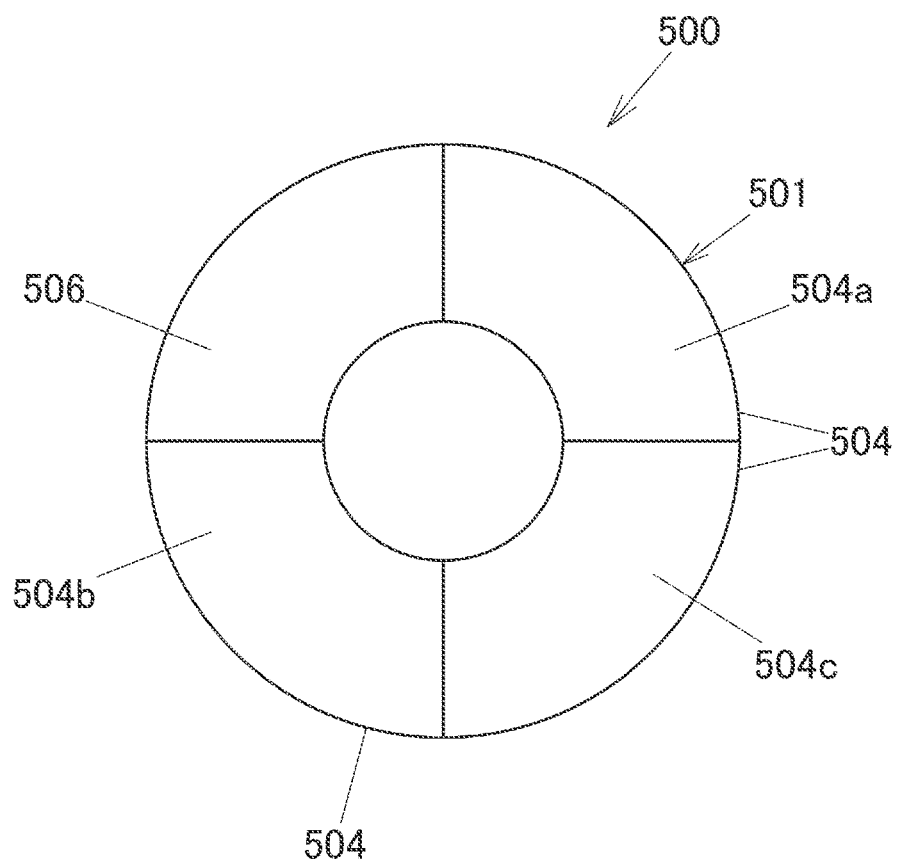
FIG. 11 is a schematic plan view of a rotary wheel according to the third embodiment.

The following describes a third embodiment of the present disclosure, with reference to FIGS. 10 and 11. In the description of the third embodiment, the descriptions are omitted or simplified for similar configuration to the first embodiment. The light source device according to the third embodiment includes a fluorescence wheel unit 400 that is a fluorescence emitting unit. The fluorescence wheel unit 400 has a fluorescence wheel 401 having a disk shape and a fluorescence emission region 402 on the fluorescence wheel 401. The fluorescence wheel 401 is pivotally supported at the central portion by a motor shaft of a motor, so that the fluorescence wheel 401 is rotary driven by the motor around the motor shaft. One of the two plate faces of the fluorescence wheel 401 toward the light guiding optics 140 has a flat reflective portion that is processed like a mirror by silver vapor deposition, for example. The fluorescence emission region 402 is annularly located on the reflective part of the surface of the fluorescence wheel 401.

As shown in FIG. 11, a rotary wheel unit 500 has a rotary wheel 501 that includes a filter region 504 and a transmission bending region 506 on one of the two plate faces of the rotary wheel 501 toward the excitation light irradiation unit 70. The filter region 504 includes a first filter region 504a, a second filter region 504b, and a third filter region 504c. The first filter region 504a, the second filter region 504b, the third filter region 504c, and the transmission bending region 506 are placed side by side in the circumferential direction of the rotary wheel 501. In the example shown in FIG. 11, these regions are arranged in angular ranges of approximately 90 degrees.

The first filter region 504a, second filter region 504b, and third filter region 504c are all dichroic mirror processed. The first filter region 504a transmits green wavelength band light and reflects blue wavelength band light and red wavelength band light. The second filter region 504b transmits red wavelength band light and reflects blue wavelength band light and green wavelength band light. The third filter region 504c transmits yellow wavelength band light and reflects blue wavelength band light, green wavelength band light and red wavelength band light.

As shown in FIG. 10, the filter region 504 of the rotary wheel 501 includes an excitation light reflecting region 505 on the face opposite of the first filter region 504a, the second filter region 504b, and the third filter region 504c and at a region corresponding to the positions of these regions. The rotary wheel 501 also includes a transmission diffusion region 507 in the region corresponding to the transmission bending region 506 on the opposite face. The light source device according to the present embodiment transmits the fluorescence emitted from the fluorescence emission region 402 through the third filter region 504c of the filter region 504 according to the color design, thus guiding the yellow wavelength band light toward the light source optics. In one embodiment, the rotary wheel 501 may not have the transmission diffusion region 507 or may not have the excitation light reflecting region 505.

As shown in FIG. 10, the light source device according to the third embodiment also is configured so that the optical path of the blue wavelength band light, which is the excitation light, is the same as the optical paths of the red wavelength band light, the green wavelength band light and the yellow wavelength band light that are different from the excitation light. (In FIG. 10, the excitation light reflected toward the light guiding optics 140 (blue wavelength band light) and the excitation light transmitted through the rotary wheel unit 500 are shown with the solid line, while the yellow wavelength band fluorescence emitted from the fluorescence emission region 402 of the fluorescence wheel unit 400 and the red, green and yellow wavelength band light transmitted through the rotary wheel unit 500 are shown with the dashed-dotted line). This configuration leads to the same advantageous effects (downsizing of the device, higher efficiency, and reduction of color irregularities) as those of the light source device 60 of the first embodiment and the light source device of the second embodiment.

The present embodiment includes the fluorescence wheel unit 400 that is the fluorescence emitting unit, and this changes the color of the fluorescence emitted from the fluorescence emission region 402 to a color other than the yellow wavelength band light, if necessary. This fluorescence wheel unit 400 suppresses the concentration of heat due to the irradiation with excitation light on a part of the fluorescence emission region 402.

In one embodiment, the first embodiment and the second embodiment as stated above may include the fluorescence wheel unit 400 instead of the fixed phosphor 200 that is a fluorescence emitting unit. In one embodiment, the first embodiment and the second embodiment as stated above may include the configuration of the rotary wheel 501 described referring to FIG. 10 and FIG. 11. Specifically, the filter region 104 (or filter region 304) may have a third filter region similar to the third filter region 504c on the same face as the first filter region 104a (or first filter region of the filter region 304) and the second filter region 104b (or second filter region of the filter region 304), where the third filter region transmits yellow wavelength band light and reflects blue, green, and red wavelength band light. In this case, the first filter region 104a (or the first filter region of the filter region 304), the second filter region 104b (or the second filter region of the filter region 304), the third filter region, and the transmission bending region 106 (or transmission diffusion region 107) are placed side by side in the circumferential direction of the rotary wheel 101 or 301.

Fourth Embodiment

Figure 12:
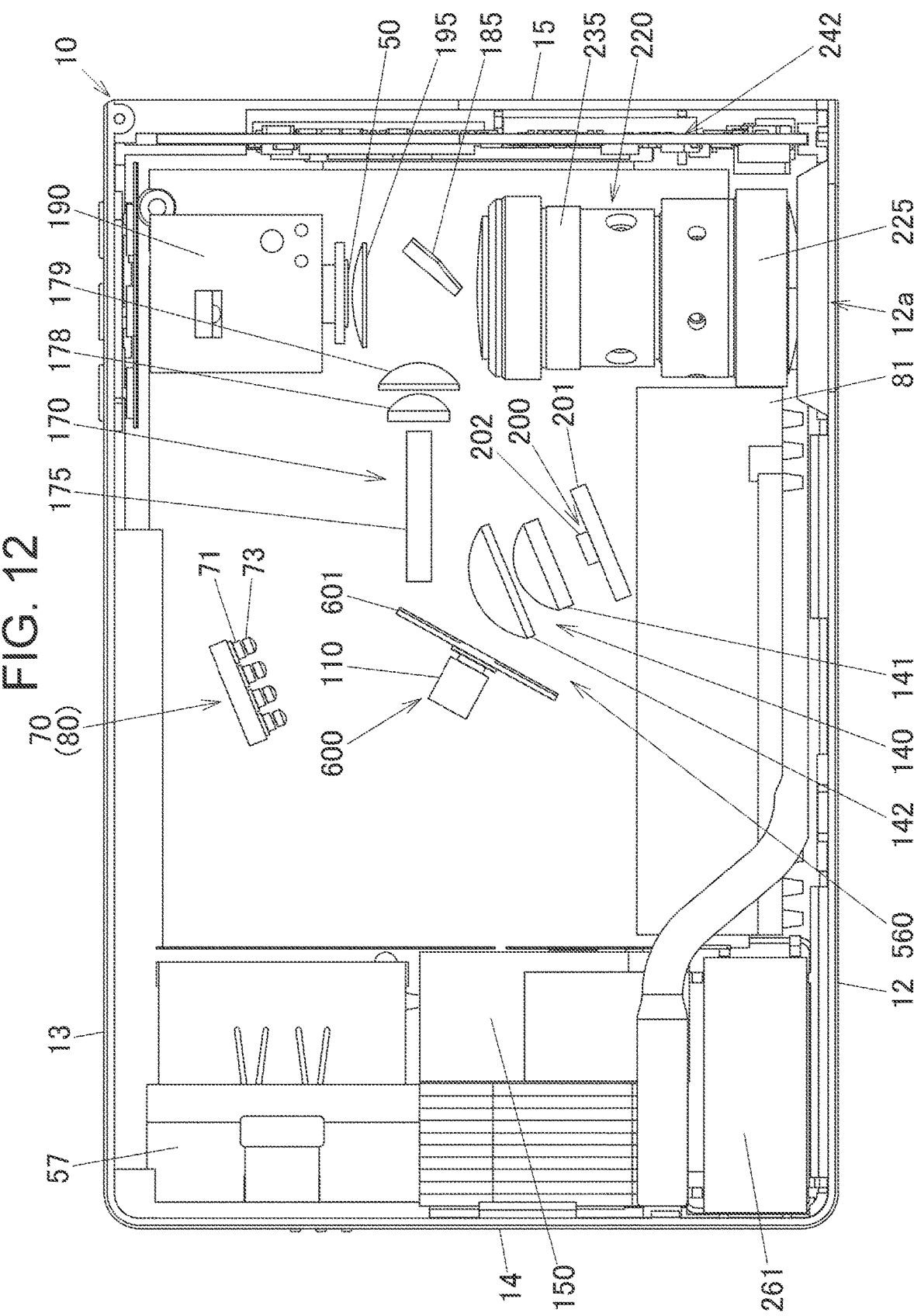
FIG. 12 is a schematic plan view showing the internal configuration of the projector according to a fourth embodiment.
Figure 13A:
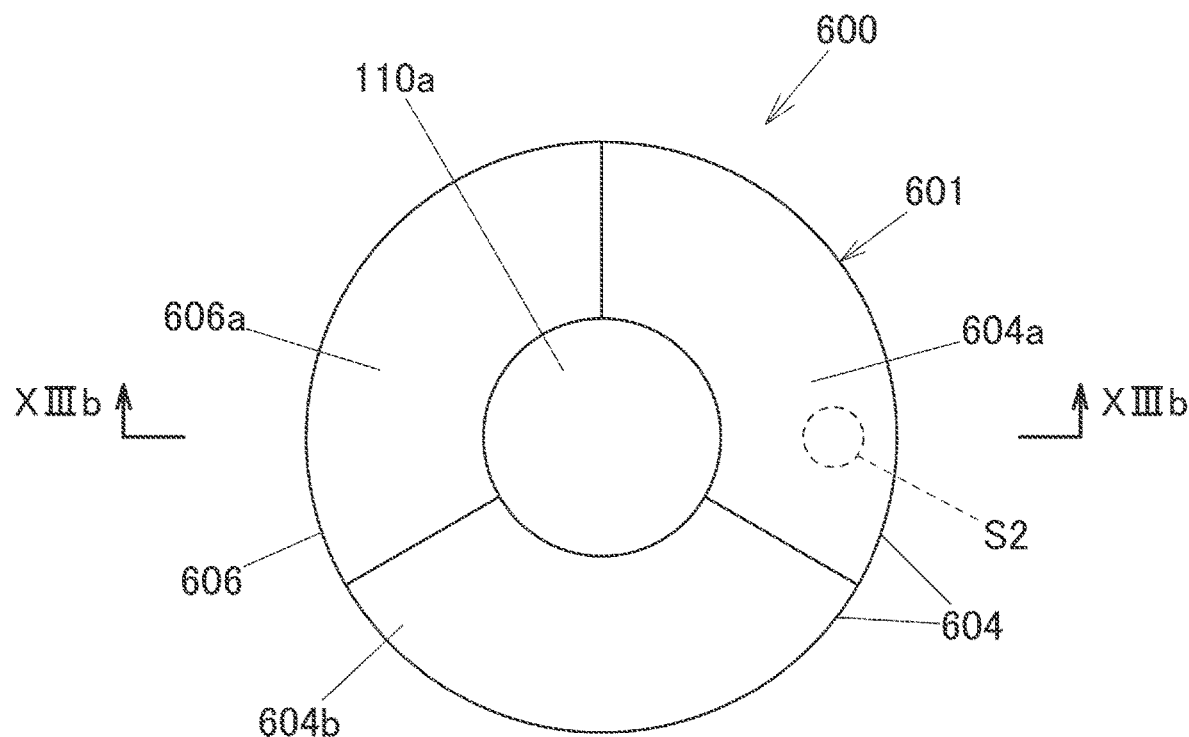
FIGS. 13A and 13B schematically show a rotary wheel unit according to the fourth embodiment, where
Figure 13B:
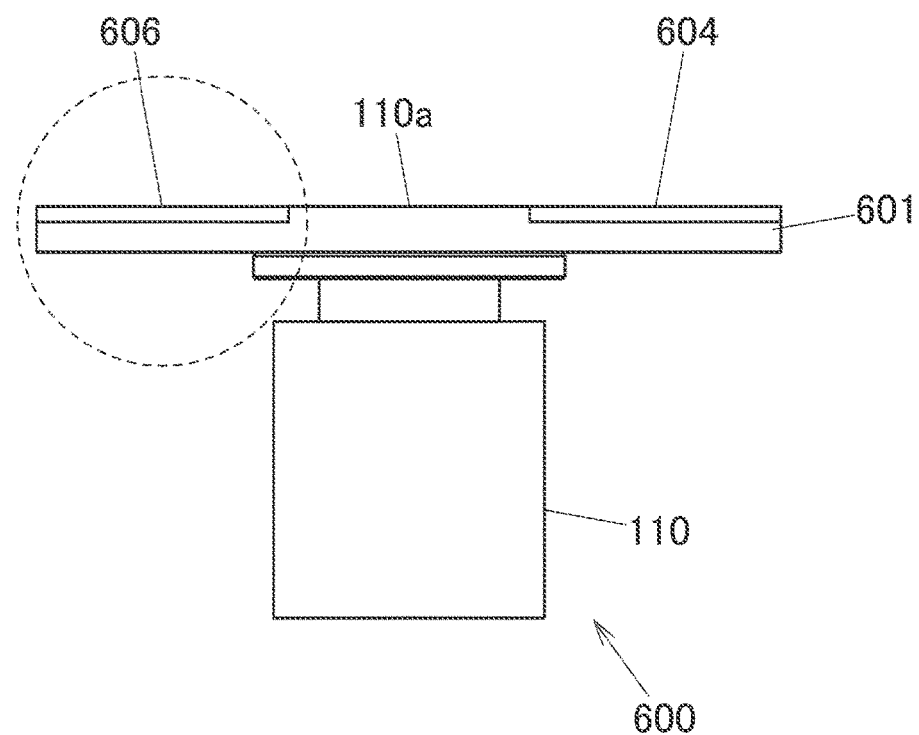

Next, the following describes a fourth embodiment of the present disclosure, with reference to FIGS. 12 to 16. In the description of the fourth embodiment, the descriptions are omitted or simplified for similar configuration to the first embodiment. As shown in FIG. 12, a projector 10 according to the fourth embodiment includes a light source device 560 located at a substantially central portion of the projector 10, a light source optics 170 located on the left of the light source device 560, and a projection optics 220 located between the light source optics 170 and the control circuit board 242.

The light source device 560 includes: an excitation light irradiation unit 70 that is a light source for the blue wavelength band light (first wavelength band light) and also serves as an excitation light source; a red-green light source unit 80 that is a light source for the red wavelength band light (third wavelength band light) and the green wavelength band light (fourth wavelength band light); a rotation wheel unit 600; and a fixed phosphor 200 (fluorescence emitting unit). The excitation light irradiation unit 70 is placed toward one of the plate faces of the rotary wheel 601 of the rotary wheel unit 600, and the fixed phosphor 200 (fluorescence emitting unit) is placed toward the other plate face of the rotary wheel 601 on the opposite of the face toward the excitation light irradiation unit 70. The excitation light irradiation unit 70 has the same configuration and action as those in the first embodiment. The red-green light source unit 80 includes the excitation light irradiation unit 70, the rotary wheel unit 600, and the fixed phosphor 200. The light source device 560 includes: a light guiding optics 140 that guides the excitation light transmitted through the rotary wheel unit 600 to the fixed phosphor 200 and guides the fluorescence emitted from a fluorescence emission region 202 of the fixed phosphor 200 to the rotary wheel unit 600; and a light source optics 170 that guides the light transmitted through the rotary wheel unit 600.

Next, the configuration of the rotary wheel 601 of the rotary wheel unit 600 is described. The rotary wheel 601 is a color wheel that is made of a transparent material such as glass or resin having transparency and has a filter region 604 and a transmission bending region 606. The configuration for rotary driving of the rotary wheel 601 is the same as in the first embodiment (see FIG. 13B). The filter region 604 includes a first filter region 604a and a second filter region 604b on one of the two plate faces (the surface) of the rotary wheel 601 that is on the opposite of the face toward the excitation light irradiation unit 70. The transmission bending region 606 is in a different region from the filter region 604 on one of the two plate faces (the surface) of the rotary wheel 601 that is on the opposite of the face toward the excitation light irradiation unit 70. The first filter region 604a, the second filter region 604b, and the transmission bending region 606 are placed side by side in the circumferential direction of the rotary wheel 601. In the example shown in FIG. 13A, these regions are arranged in angular ranges of approximately 120 degrees. The ratio occupied by these first filter region 604a, second filter region 604b, and transmission bending region 606 is not limited to the angle ranges of approximately 120 degrees, and may be appropriately changed.

The first filter region 604a and the second filter region 604b in the filter region 604 are processed like a dichroic mirror, so as to reflect light in a part of the wavelength band of the fluorescence emitted from the fluorescence emission region 202 described later and transmit light in a predetermined wavelength band of excitation light and light in another part of the wavelength band of the fluorescence. Specifically, the first filter region 604a reflects green wavelength band light (fourth wavelength band light) and transmits blue wavelength band light (first wavelength band light) that is a wavelength band of excitation light and red wavelength band light (third wavelength band light). The second filter region 604b reflects red wavelength band light and transmits blue wavelength band light and green wavelength band light.

The transmission bending region 606 bends and transmits the blue wavelength band light, which is the wavelength band of excitation light. The blue wavelength band light incident on the transmission bending region 606 is refracted to be guided toward a light tunnel 175 described later.

Figure 14A:
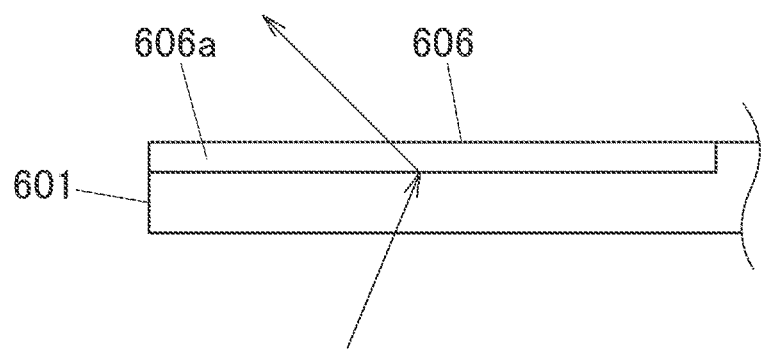
FIG. 14A is a schematic cross-sectional view of the rotary wheel unit, enlarging the part enclosed by the dashed line in FIG. 13B.

Specifically, the blue wavelength band light incident on the transmission bending region 606 is bent at an angle so that its optical axis overlaps with the light guiding direction of a light guiding optics 170 described below. As shown in FIG. 14A, the transmission bending region 606 in this embodiment has a transmission diffraction grating 606a (diffraction grating) that diffracts blue wavelength band light. The transmission grating 606a, which makes up the transmission bending region 606, can be easily formed by grooving the plate face of the rotary wheel 601. This transmission grating 606a guides the blue wavelength band light incident on the transmission bending region 606 in the optical path shown by the arrow in FIG. 14A. This transmission bending region 606 may have a diffusion property to diffuse blue wavelength band light if necessary.

Figure 14B:
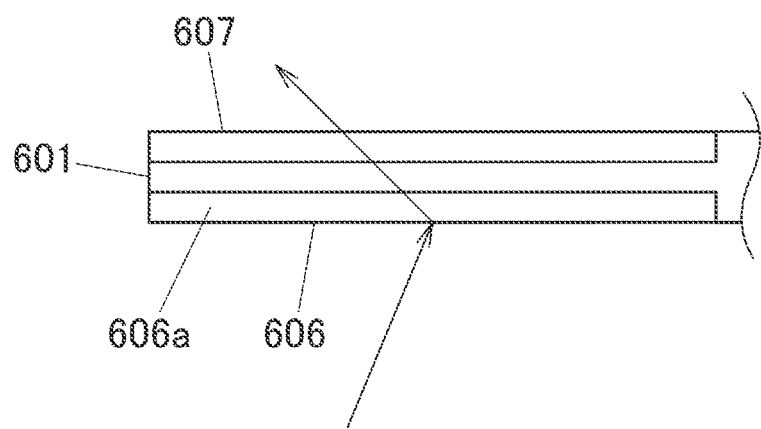
FIG. 14B is a schematic cross-sectional view according to a modified example of the part shown in FIG. 14A.

This embodiment describes the example of having the transmission bending region 606 on the surface of the rotary wheel 601 and the transmission diffraction grating 606a in the transmission bending region 606. In another embodiment, as shown in FIG. 14B, the transmission bending region 606 may be located in a region on the rear face of the rotary wheel 601 that does not correspond to the filter region 604, and a transmission diffusion region 607 may be located on a region on the surface of the rotary wheel 601 that corresponds to the transmission bending region 606 so as to transmit and diffuse the blue wavelength band light that passes through the transmission bending region 606. In this case, the blue wavelength band light incident on the transmission bending region 606 is guided in the optical path shown by the arrow in FIG. 14B. In one embodiment, the transmission bending region 606 may have the structure shown in FIG. 4B or FIG. 4C. That is, the transmission bending region 606 may have a plurality of micro transmission refractive members each having an inclined surface that refracts blue wavelength band light and arranged in a concentric pattern, or may have a single transmission refracting member with an inclined surface that refracts blue wavelength band light. In one embodiment, the transmission diffusion region 607 may be omitted in the configuration of FIG. 14B. For example, the quality of an image projected onto the projecting target may be good without diffusing the blue wavelength band light by the rotary wheel 601. In this case, the transmission diffusion region 607 may be omitted.

The rotary wheel unit 600 is configured so that the optical axis of the blue wavelength band light that is bent at the transmission bending region 606 and transmitted through the transmission bending region 606 overlaps with the optical axis of the fluorescence reflected from the filter region 604 (the first filter region 604a or the second filter region 604b). That is, the rotary wheel unit 600 has the function of combining the blue wavelength band light transmitted through the transmission bending region 606 with the optical axis that is the same as that of the green and red wavelength band light reflected from the filter region 604. Specifically, the excitation light irradiation unit 70, the rotary wheel unit 600, and the fixed phosphor 200 (fluorescence emitting unit) are placed so that the optical axis of the blue wavelength band light transmitted through the transmission bending region 606 overlaps with the optical axis of the fluorescence reflected from the filter region 604.

The fluorescence in the yellow wavelength band emitted from the phosphor region 202 and incident on the filter region 604 of the rotary wheel unit 600 is separated by the filter region 604 into light in a predetermined wavelength band different from the wavelength band of the excitation light. Specifically, the fluorescence in the yellow wavelength band contains red wavelength band light and green wavelength band light. The first filter region 604a transmits the red wavelength band light for removal, and extracts the green wavelength band light to be reflected by the rotary wheel 601, and the second filter region 604b transmits the green wavelength band light for removal, and extracts the red wavelength band light to be reflected by the rotary wheel 601.

Figure 15:
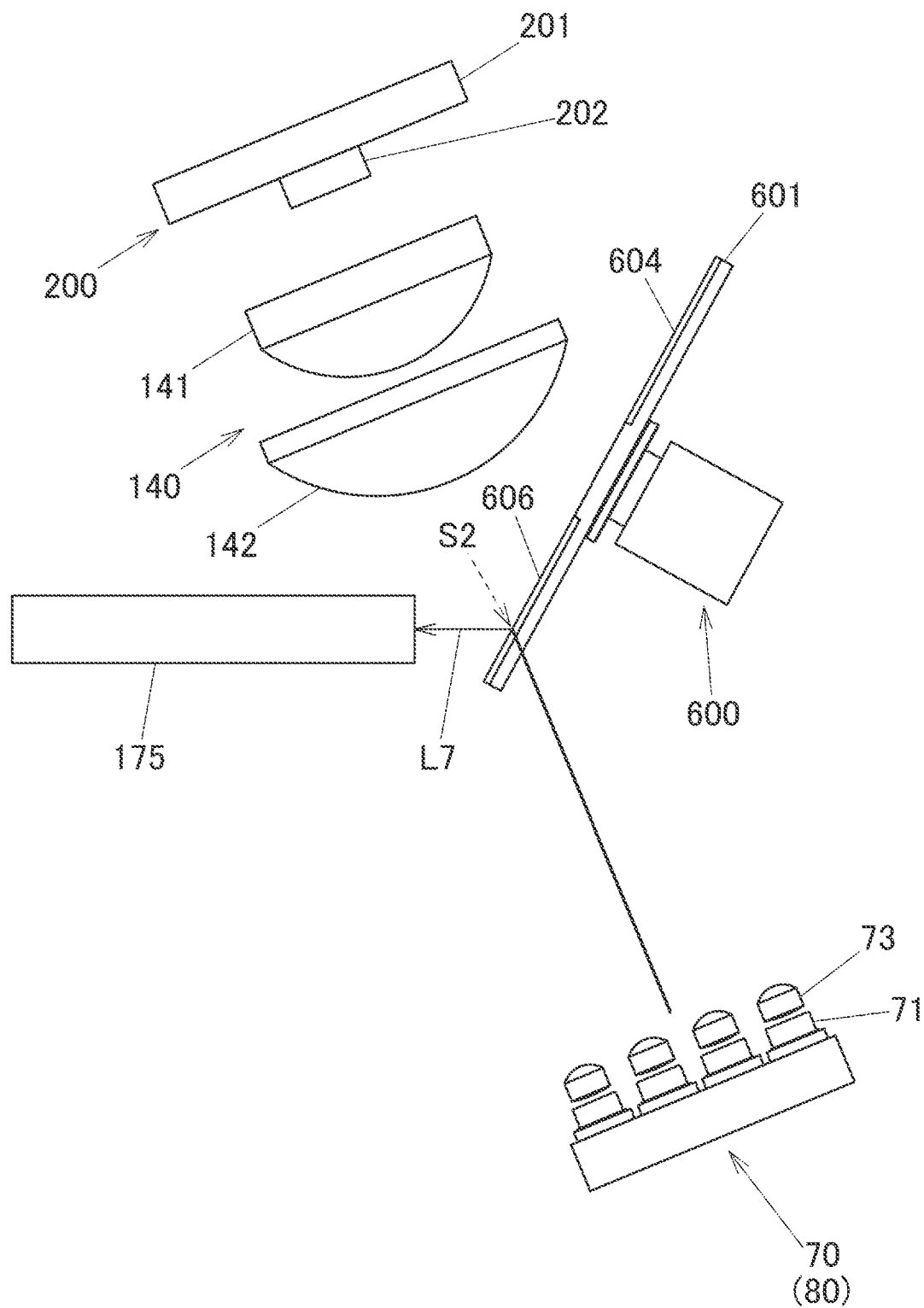
FIG. 15 is a schematic plan view showing how the excitation light applied to the rotary wheel unit of the fourth embodiment bends and passes through the rotary wheel unit.

Next, the light coming in and out of the rotary wheel unit 600 will be described. Referring first to FIG. 15, the following describes the case in which blue wavelength band light, the excitation light, is emitted from the rotary wheel unit 600. In this drawing, the position on the rotary wheel 601 on which the excitation light (light L7 shown by the solid line in FIG. 15) is incident is defined as the irradiation spot S2 (see also FIG. 13A). In FIG. 15, the transmission bending region 606 of the rotary wheel 601 is located at the irradiation spot S2.

The excitation light emitted from the excitation light irradiation unit 70 is incident at an angle on the rear face of the rotary wheel 601. While the transmission bending region 606 is located at the irradiation spot S2, the excitation light incident obliquely on the rotary wheel 601 enters the transmission bending region 606 of the rotary wheel 601. The excitation light incident on the transmission bending region 606 is bent toward the light tunnel 175 by the transmission bending region 606 while passing through the transmission bending region 606, and is emitted toward the light tunnel 175. In this way, the excitation light, which is the blue wavelength band light, can be used as the light source light. When the transmission diffusion region 607 is placed on the surface of the rotary wheel 601 in a region corresponding to the transmission bending region 606, the excitation light incident obliquely on the rotary wheel 601 is bent by the transmission bending region 606, and then is diffused by the transmission diffusion region 607, and is emitted toward the light tunnel 175.

Figure 16:
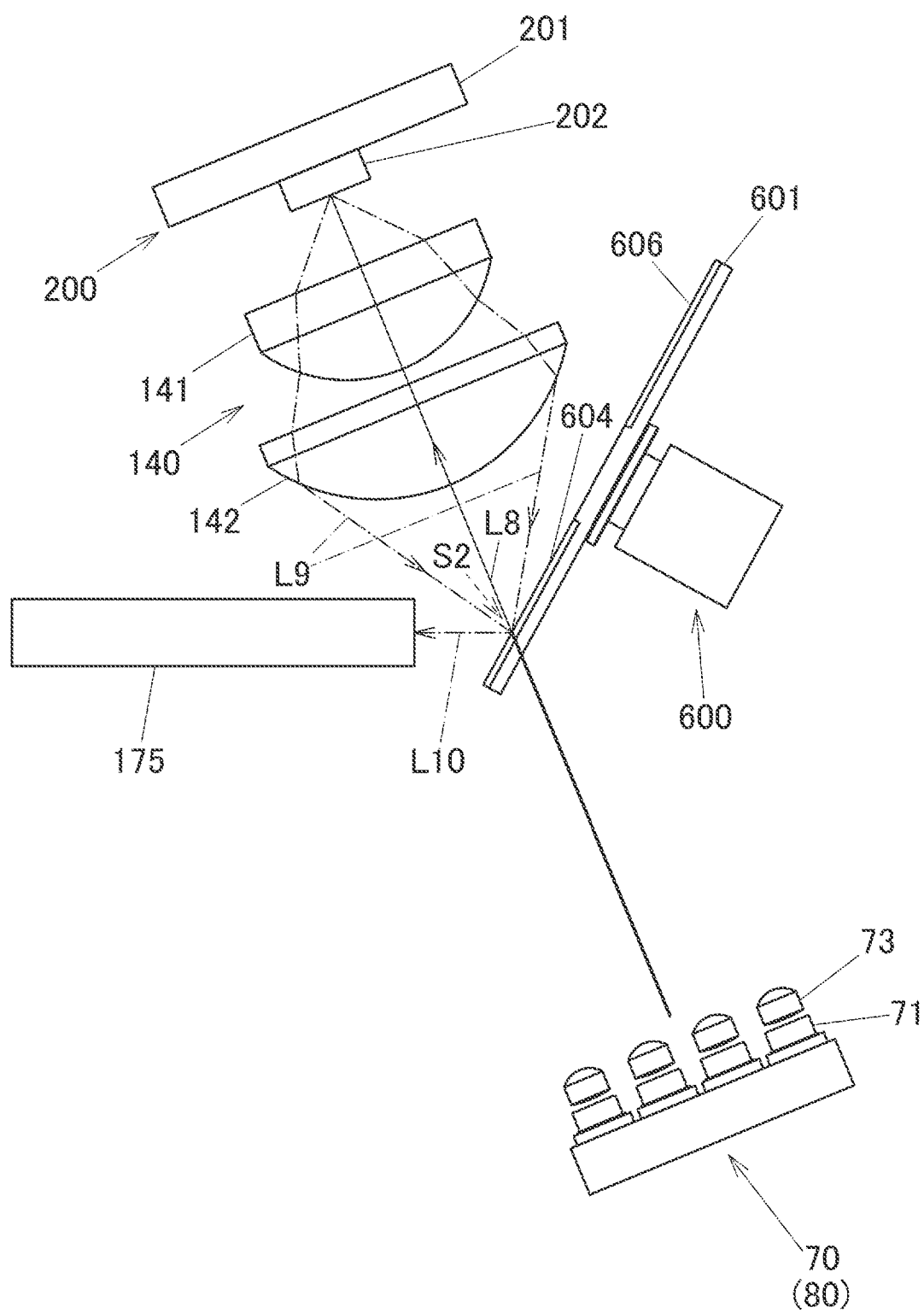
FIG. 16 is a schematic plan view showing how the excitation light applied to the rotary wheel unit of the fourth embodiment passes through the rotary wheel unit and is applied to the fluorescence emission region of the fluorescence emitting unit to emit fluorescence.

Referring next to FIG. 16, the following describes the case where green wavelength band light fluorescence is emitted from the rotary wheel unit 600 and the case where red wavelength band light fluorescence is emitted from the rotary wheel unit 600. In FIG. 16, the first filter region 604a or the second filter region 604b in the filter region 604 of the rotary wheel 601 is located at the irradiation spot S2.

The excitation light emitted from the excitation light irradiation unit 70, which is incident at an angle to the plate face (rear face) of the rotary wheel 601, enters the first filter region 604a or the second filter region 604b in the filter region 604 of the rotary wheel 601. The excitation light incident on the filter region 604 passes through the filter region 604 without bending and is emitted toward the light guiding optics 140.

The excitation light (light L8 shown by solid line in FIG. 16) emitted toward the light guiding optics 140 enters the second collecting lens 142 from the front face, and passes through the second collecting lens 142 and the first collecting lens 141 in this order for irradiation of the fluorescence emission region 202 of the fixed phosphor 200. The excitation light emitting unit 70 in the light source device 560 is placed to oppose the face of the fixed phosphor 200 containing the fluorescence emission region 202 with the rotary wheel 601 interposed therebetween, so that the excitation light passing through the filter region 604 can be incident on the first collecting lens 141 and second collecting lens 142 from their front faces. When the phosphor particles in the fluorescence emission region 202 are irradiated with the excitation light, fluorescence in the yellow wavelength band (light L9 shown by the dashed-dotted line in FIG. 16) is emitted in all directions. Note that the light emitted from the fluorescence emission region 202 contains fluorescence in the yellow wavelength band and residual excitation light reflected by the substrate 201 without being applied to the phosphor particles. Of the fluorescence and residual excitation light emitted from the phosphor region 202, part of the fluorescence and residual excitation light emitted toward the light source optics 140 is collected by the first collecting lens 141 and second collecting lens 142, and enters the rotary wheel 601 from the surface.

When the first filter region 604a is located at the irradiation spot S2 of the rotary wheel 601, the first filter region 604a transmits the fluorescence in the red wavelength band of the fluorescence in the yellow wavelength band for removal, so that the fluorescence in the green wavelength band is reflected from the first filter region 604a. The residual excitation light incident on the first filter region 604a passes through the first filter region 604a for removal. Similarly, when the second filter region 604b is located at the irradiation spot S2, the second filter region 604b transmits the fluorescence in the green wavelength band of the fluorescence in the yellow wavelength band for removal, so that the fluorescence in the red wavelength band is reflected from the second filter region 604b. The residual excitation light incident on the second filter region 604b passes through the second filter region 604b for removal. In this way, the residual excitation light has been almost removed from the obtained red wavelength band light and green wavelength band light (light L10 shown by the dashed-dotted line in FIG. 16).

The red wavelength band light and green wavelength band light reflected from the filter region 604 are emitted toward the light tunnel 175. The rotary wheel 601 in the light source device 560 is placed at an angle inclined to the plane containing the fluorescence emission region 202 of the fixed phosphor 200, so that the red wavelength band light and green wavelength band light reflected from the filter region 604 can be guided toward the light tunnel 175. The optical paths of the red wavelength band light and green wavelength band light directed from the rotary wheel unit 600 to the light tunnel 175 are the same as the optical path of the excitation light directed from the rotary wheel unit 600 to the light tunnel 175. That is, the rotary wheel unit 600 is positioned at a location and angle such that the optical axis of the excitation light transmitted through the transmission bending region 606 overlaps with the optical axes of the red wavelength band light and green wavelength band light reflected from the filter region 604.

As described above, the light source device 560 is configured so that the optical path of the blue wavelength band light, which is the excitation light, is the same as those of the red wavelength band light and the green wavelength band light that are different from the excitation light. With this configuration, this light source device has a reduced number of components compared with conventional light source devices that have separate optical paths for the excitation light and for the wavelength band light different from the excitation light. This makes the device smaller and more efficient. The light source device 560 suppresses color irregularities caused by errors due to separate optical paths for the excitation light and for the wavelength band light different from the excitation light. The rotary wheel 601 has the transmission bending region 606 that bends and transmits the excitation light. This eliminates a member for bending the excitation light, and thus makes the device smaller.

In the light source device 560, the excitation light irradiation unit 70 is placed on the opposite of the fixed phosphor 200 relative to the plate faces of the rotary wheel 601. This allows the excitation light emitted from the excitation light irradiation unit 70 to be easily incident on the light guiding optics 140, thereby increasing the degree of freedom in the placement of the excitation light irradiation unit 70 and facilitating the optical axis adjustment.

Fifth Embodiment

Figure 17:
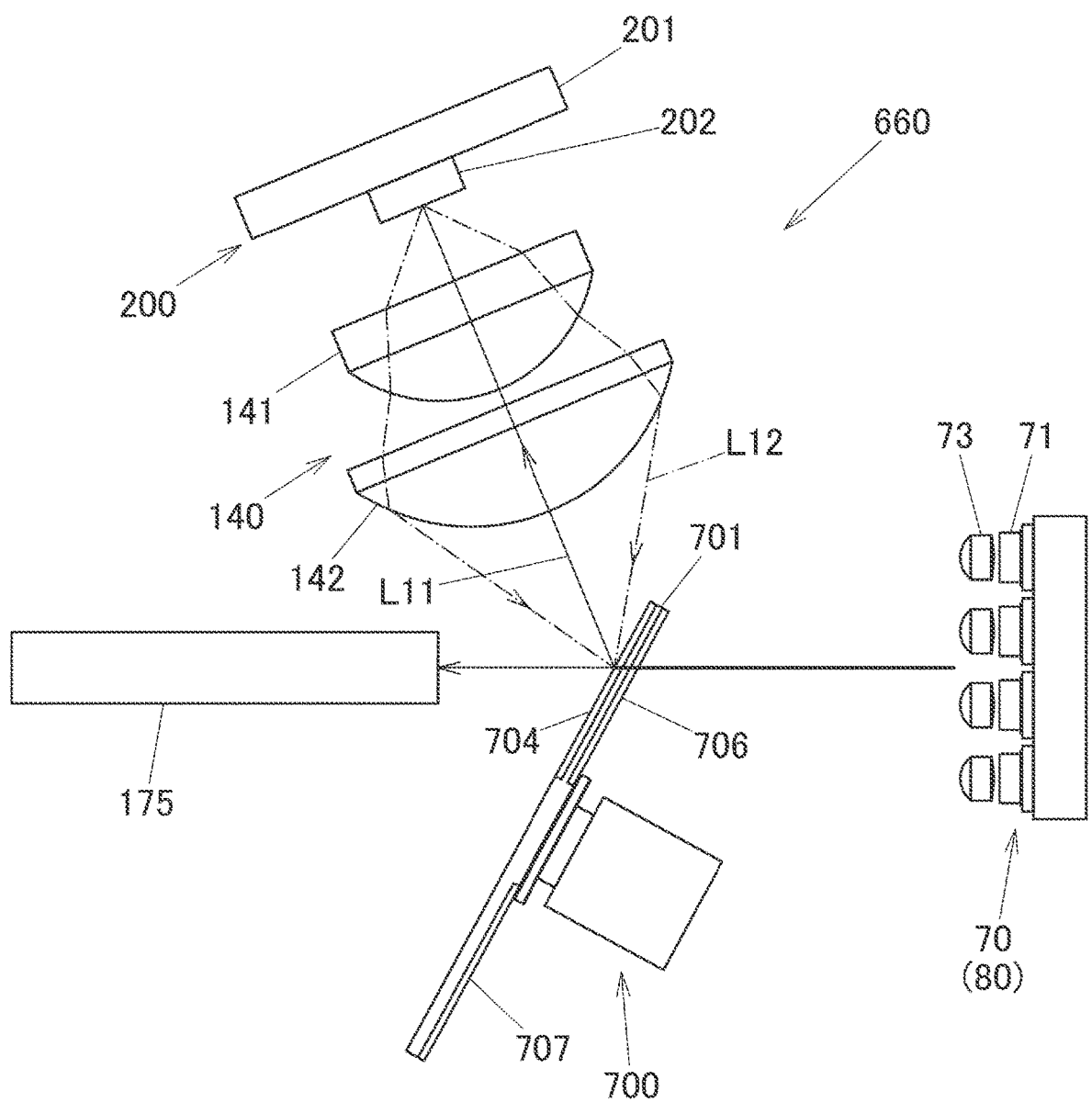
FIG. 17 is a schematic plan view showing how the excitation light applied to the rotary wheel unit of a fifth embodiment passes through the rotary wheel unit and how the excitation light applied to the rotary wheel unit passes through the rotary wheel unit and is applied to the fluorescence emission region of the fluorescence emitting unit to emit fluorescence.

Next, the following describes a fifth embodiment of the present disclosure, with reference to FIG. 17. In the description of the fifth embodiment, the descriptions are omitted or simplified for similar configuration to the fourth embodiment. A light source device 660 according to the fifth embodiment differs from that of the fourth embodiment in the arrangement of the excitation light irradiation unit 70, the fixed phosphor 200, and the light guiding optics 140, and the arrangement and configuration of the rotary wheel unit 700. As shown in FIG. 17, the excitation light irradiation unit 70 in this light source device 660 is opposed to the light tunnel 175 so that the light tunnel 175 is located on the optical axis of the excitation light emitted from the excitation light irradiation unit 70.

The rotary wheel 701 of the rotary wheel unit 700 is placed at an angle inclined to the plane containing the fluorescence emission region 202 of the fixed phosphor 200 so that the light emitted from the excitation light irradiation unit 70 enters the plate face (rear face) of the rotary wheel 701 at an inclined angle. The rotary wheel 701 includes a filter region 704 and a transmission bending region 706 in the same region on its plate faces. That is, the rotary wheel 701 includes the filter region 704 on one (the surface) of the two plate faces on the opposite of the excitation light irradiation unit 70 and includes the transmission bending region 706 on the rear face in the region corresponding to the filter region 704. The filter region 704 includes a first filter region and a second filter region that are placed side by side in the circumferential direction of the rotary wheel 701. The action of the filter region 704, the transmission bending region 706, the first filter region, and the second filter region is the same as in the fourth embodiment.

The rotary wheel 701 includes an excitation light transmission region 707 on one (the rear face) of the two plate faces toward the excitation light irradiation unit 70 and in a region different from the filter region 704 and the transmission bending region 706. The excitation light transmission region 707 transmits the blue wavelength band light. This excitation light transmission region 707 may have a diffusion property to diffuse blue wavelength band light if necessary. In one embodiment, this excitation light transmission region 707 is made of a transparent material such as glass or resin having transparency. In one embodiment, the excitation light transmission region 707 may be placed on the surface of the rotary wheel 701 or on both faces of the rotary wheel 701.

In one embodiment, as described in the first embodiment, the transmission bending region 706 may have a transmission diffraction grating that diffracts blue wavelength band light. The transmission bending region 706 may have a plurality of micro transmission refractive members each having an inclined surface that refracts blue wavelength band light and arranged in a concentric pattern. The transmission bending region 706 may have a single transmission refractive member with an inclined face that refracts blue wavelength band light.

The rotary wheel unit 700 is configured so that the optical axis of the blue wavelength band light that passes through the excitation light transmission region 707 overlaps with the optical axis of the fluorescence reflected from the filter region 704 (the first filter region or the second filter region). That is, the rotary wheel unit 700 has the function of combining the blue wavelength band light transmitted through the excitation light transmission region 707 with the optical axis that is the same as that of the green and red wavelength band light reflected from the filter region 704.

Next, the light coming in and out of the rotary wheel unit 700 in the fifth embodiment will be described. First, the following describes the case in which blue wavelength band light, the excitation light, is emitted from the rotary wheel unit 700. In this case, the excitation light transmission region 707 of the rotary wheel 701 is located at the irradiation spot on the rotary wheel 701, on which the excitation light is incident. The excitation light emitted from the excitation light irradiation unit 70 is incident at an angle on the plate face (rear face) of the rotary wheel 701. While the excitation light transmission region 707 is located at the irradiation spot, the excitation light incident obliquely on the rotary wheel 701 enters the excitation light transmission region 707 of the rotary wheel 701. The excitation light incident on the excitation light transmission region 707 passes through the excitation light transmission region 707 without bending and is emitted toward the light tunnel 175. In this way, the excitation light, which is the blue wavelength band light, can be used as the light source light.

Next, the following describes the case where green wavelength band light fluorescence is emitted from the rotary wheel unit 700 and the case where red wavelength band light fluorescence is emitted from the rotary wheel unit 700. In this case, the filter region 704 is located at the irradiation spot on the surface of the rotary wheel 701, and the transmission bending region 706 is located at the irradiation spot on the rear face. The excitation light emitted from the excitation light irradiation unit 70, which is incident at an angle to the plate face (rear face) of the rotary wheel 701, enters the transmission bending region 706 of the rotary wheel 701. The excitation light incident on the transmission bending region 706 is bent toward the light guiding optics 140 by the transmission bending region 706 while passing through the transmission bending region 706 and the filter region 704, and is emitted toward the light guiding optics 140.

The excitation light (light L11 shown by solid line in FIG. 17) emitted toward the light guiding optics 140 enters the second collecting lens 142 from the front face, and passes through the second collecting lens 142 and the first collecting lens 141 in this order for irradiation of the fluorescence emission region 202 of the fixed phosphor 200. When the phosphor particles in the fluorescence emission region 202 are irradiated with the excitation light, fluorescence in the yellow wavelength band (light L12 shown by the dashed-dotted line in FIG. 17) is emitted in all directions. Of the fluorescence and residual excitation light emitted from the phosphor region 202, part of the fluorescence and residual excitation light emitted toward the light source optics 140 is collected by the first collecting lens 141 and second collecting lens 142, and enters the rotary wheel 701 from the surface.

When the first filter region is located at the irradiation spot of the rotary wheel 701, the first filter region reflects the fluorescence in the green wavelength band. When the second filter region is located there, the second filter region reflects the fluorescence in the red wavelength band. The red wavelength band light and green wavelength band light reflected from the filter region 704 are emitted toward the light tunnel 175. The optical paths of the red wavelength band light and green wavelength band light directed from the rotary wheel unit 700 to the light tunnel 175 are the same as the optical path of the excitation light directed from the rotary wheel unit 700 to the light tunnel 175.

As described above, the light source device 660 according to the present embodiment is configured so that the rotary wheel 701 is placed on the face opposite of the transmission bending region 706 and in the region corresponding to the transmission bending region 706, and includes the filter region 704 that reflects fluorescence in the green and red wavelength bands and transmits excitation light, and the excitation light transmission region 707 in a region different from the transmission bending region 706 and transmits excitation light. The rotary wheel unit 700 is configured so that the optical axis of the excitation light that passes through the excitation light transmission region 707 overlaps with the optical axis of the fluorescence in the green and red wavelength bands reflected from the filter region 704. Similarly to the fourth embodiment, this configuration reduces the number of components as compared with conventional light source devices, and enables a compact device with high efficiency. The light source device suppresses color irregularities caused by errors due to separate optical paths for the excitation light and for the wavelength band light different from the excitation light.

The light source device 660 according to the present embodiment is configured so that the excitation light emitted from the excitation light irradiation unit 70 is bent by the transmission bending region 706 of the rotary wheel 701 to irradiate the fluorescence emission region 202 of the fixed phosphor 200 with the excitation light. This allows the excitation light to be easily applied to the fixed phosphor 200.

Sixth Embodiment

Figure 18:
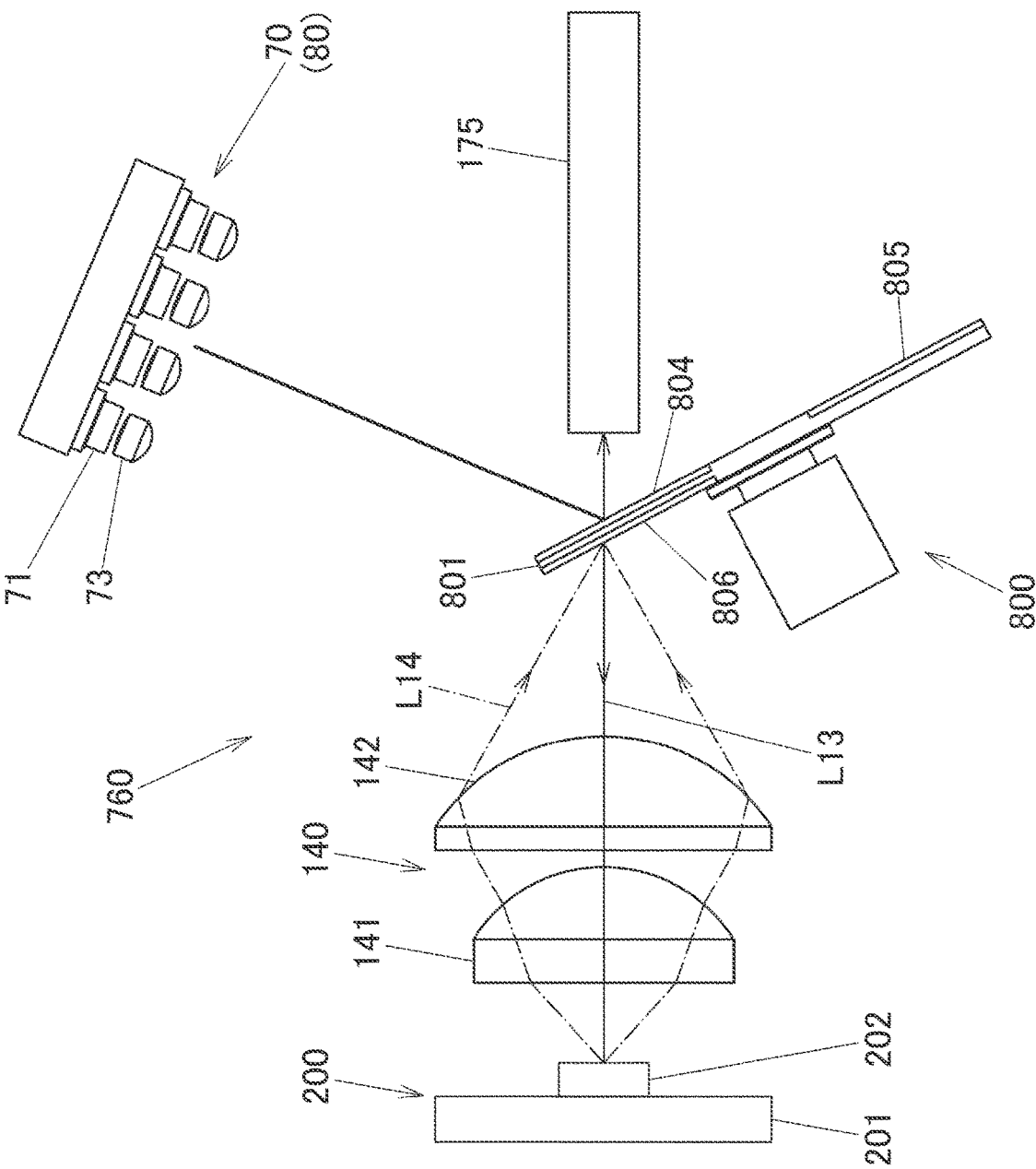
FIG. 18 is a schematic plan view showing how the excitation light applied to the rotary wheel unit of a sixth embodiment is reflected from the rotary wheel unit and how the excitation light applied to the rotary wheel unit passes through the rotary wheel unit and is applied to the fluorescence emission region of the fluorescence emitting unit to emit fluorescence.

Next, the following describes a sixth embodiment of the present disclosure, with reference to FIGS. 18 and 19. In the description of the sixth embodiment, the descriptions are omitted or simplified for similar configuration to the fourth embodiment. A light source device 760 according to the sixth embodiment differs from that of the fourth embodiment in the arrangement of the excitation light irradiation unit 70, the fixed phosphor 200, and the light guiding optics 140, and the arrangement and configuration of the rotary wheel unit 800. In the light source device 760 according to the sixth embodiment, the fixed phosphor 200 is placed on the opposite of the light tunnel 175 relative to the rotary wheel unit 800.

Figure 19A:
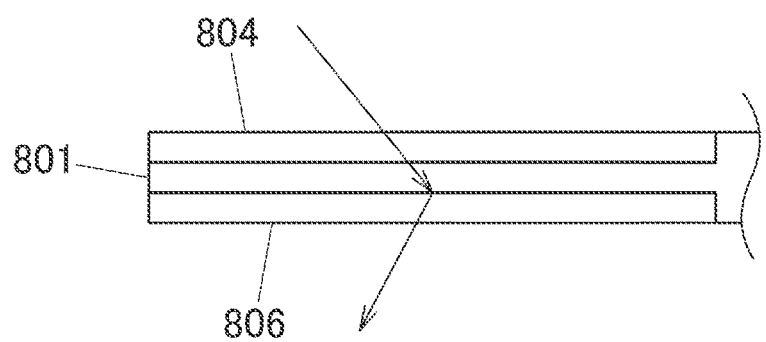
FIG. 19A is a partially enlarged schematic cross-sectional view of the rotary wheel unit according to the sixth embodiment.

The rotary wheel 801 of the rotary wheel unit 800 is placed at an angle inclined to the plane containing the fluorescence emission region 202 of the fixed phosphor 200 so that the light emitted from the excitation light irradiation unit 70 enters the plate face (surface) of the rotary wheel at an inclined angle. As shown in FIG. 19A, the rotary wheel 801 includes a filter region 804 and a transmission bending region 806 in the same region on its plate faces. That is, the rotary wheel 801 includes the filter region 804 on one (the surface) of the two plate faces toward the excitation light irradiation unit 70 and includes the transmission bending region 806 on the rear face in the region corresponding to the filter region 804. The filter region 804 includes a first filter region and a second filter region that are placed side by side in the circumferential direction of the rotary wheel 801. As indicated by the arrow in FIG. 19A, the blue wavelength band light incident on the filter region 804 from the surface of the rotary wheel 801 passes through the filter region 804, and is bent by the transmission bending region 806 while passing through the transmission bending region 806.

Note here that the sixth embodiment differs from the fourth and fifth embodiments in the action of the transmission bending region 806 and the action of the first filter region and the second filter region of the filter region 804. Specifically, the transmission bending region 806 transmits green wavelength band light and red wavelength band light in addition to blue wavelength band light. Examples of the transmission bending region 806 include a volume hologram and a diffraction grating having a laminated structure. The first filter region transmits green wavelength band light and blue wavelength band light, and reflects red wavelength band light. The second filter region transmits red wavelength band light and blue wavelength band light, and reflects green wavelength band light.

Figure 19B:
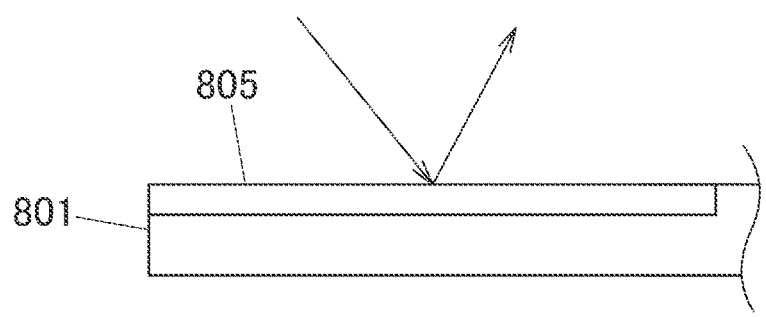
FIG. 19B is a schematic cross-sectional view, enlarging another part of the rotary wheel unit according to the sixth embodiment.

As shown in FIG. 19B, the rotary wheel 801 includes an excitation light reflecting region 805 on one (the surface) of the two plate faces toward the excitation light irradiation unit 70 and in a region different from the filter region 804 and the transmission bending region 806. The excitation light reflecting region 805 reflects the blue wavelength band light that is the excitation light. This excitation light reflecting region 805 may have a diffusion property to diffuse blue wavelength band light if necessary. As indicated by the arrow in FIG. 19B, the blue wavelength band light incident on the excitation light reflecting region 805 from the surface of the rotary wheel 801 is reflected from the excitation light reflecting region 805.

The rotary wheel unit 800 is configured so that the optical axis of the blue wavelength band light that is reflected from the excitation light reflecting region 805 overlaps with the optical axis of the fluorescence passing through the filter region 804 (the first filter region or the second filter region). That is, the rotary wheel unit 800 has the function of combining the blue wavelength band light reflected from the excitation light reflecting region 805 with the optical axis that is the same as that of the green and red wavelength band light passing through the filter region 804. Specifically, the excitation light irradiation unit 70, the rotary wheel unit 800, and the fixed phosphor 200 (fluorescence emitting unit) are placed so that the optical axis of the blue wavelength band light reflected from the excitation light reflecting region 805 overlaps with the optical axis of the fluorescence passing through the filter region 804.

Referring next to FIG. 18, the light coming in and out of the rotary wheel unit 800 in the sixth embodiment will be described. First, the following describes the case in which blue wavelength band light, the excitation light, is emitted from the rotary wheel unit 800. In this case, the excitation light reflecting region 805 of the rotary wheel 801 is located at the irradiation spot on the rotary wheel 801, on which the excitation light is incident. The excitation light emitted from the collimator lens 73 of the excitation light irradiation unit 70 is incident at an angle on the surface of the rotary wheel 801. While the excitation light reflecting region 805 is located at the irradiation spot, the excitation light incident obliquely on the rotary wheel 801 enters the excitation light reflecting region 805 of the rotary wheel 801. The excitation light incident on the excitation light reflecting region 805 is reflected from the excitation light reflecting region 805 toward the light tunnel 175. In this way, the excitation light, which is the blue wavelength band light, can be used as the light source light.

Next, the following describes the case where green wavelength band light fluorescence is emitted from the rotary wheel unit 800 and the case where red wavelength band light fluorescence is emitted from the rotary wheel unit 800. In this case, the filter region 804 is located at the irradiation spot on the surface of the rotary wheel 801, and the transmission bending region 806 is located at the irradiation spot on the rear face. The excitation light emitted from the excitation light irradiation unit 70, which is incident at an angle to the plate face (surface) of the rotary wheel 801, enters the filter region 804 of the rotary wheel 801. The excitation light incident on the filter region 804 passes through the filter region 804, and is bent toward the light guiding optics 140 by the transmission bending region 806 while passing through the transmission bending region 806, and is emitted toward the light guiding optics 140.

The excitation light (light L13 shown by solid line in FIG. 18) emitted toward the light guiding optics 140 enters the second collecting lens 142 from the front face, and passes through the second collecting lens 142 and the first collecting lens 141 in this order for irradiation of the fluorescence emission region 202 of the fixed phosphor 200. When the phosphor particles in the fluorescence emission region 202 are irradiated with the excitation light, fluorescence in the yellow wavelength band (light L14 shown by the dashed-dotted line in FIG. 18) is emitted in all directions. Of the fluorescence and residual excitation light emitted from the phosphor region 202, part of the fluorescence and residual excitation light emitted toward the light source optics 140 is collected by the first collecting lens 141 and second collecting lens 142, and enters the rotary wheel 801 from the rear face.

The fluorescence and residual excitation light incident on the rotary wheel 801 from the rear face passes through the transmission bending region 806 to enter the first filter region or the second filter region. When the first filter region is located at the irradiation spot of the rotary wheel 801, fluorescence in green wavelength band passes through the first filter region. When the second filter region is located at the irradiation spot of the rotary wheel 801, fluorescence in red wavelength band passes through the second filter region. The red wavelength band light and green wavelength band light transmitted through the filter region 804 are emitted toward the light tunnel 175. The optical paths of the red wavelength band light and green wavelength band light directed from the rotary wheel unit 800 to the light tunnel 175 are the same as the optical path of the excitation light directed from the rotary wheel unit 800 to the light tunnel 175.

As described above, the light source device 760 according to the present embodiment is configured so that the transmission bending region 806 transmits the fluorescence in green wavelength band and fluorescence in red wavelength band, the rotary wheel 801 is placed on the face opposite of the transmission bending region 806 and in the region corresponding to the transmission bending region 806, and includes the filter region 804 that transmits fluorescence in the green and red wavelength bands and transmits excitation light, and the excitation light reflecting region 805 that is placed in a region different from the transmission bending region 806 and reflects the excitation light, and the rotary wheel unit 800 is configured so that the optical axis of the excitation light that is reflected from the excitation light reflecting region 805 overlaps with the optical axis of the fluorescence in a predetermined wavelength band passing through the filter region 804. Similarly to the fourth embodiment, this configuration reduces the number of components as compared with conventional light source devices, and enables a compact device with high efficiency. The light source device suppresses color irregularities caused by errors due to separate optical paths for the excitation light and for the wavelength band light different from the excitation light. In one embodiment, the transmission bending region 806 may be placed on the plate face of the rotary wheel 801 toward the excitation light irradiation unit 70, and the filter region 804 may be placed on the plate face toward the fixed phosphor 200. In one embodiment, a light guiding rod may be placed instead of the light tunnel 175 also in the fourth to sixth embodiments, or the micro-lens array 90 described referring to FIG. 5 may be placed instead of the light tunnel 175 and the concave lens 181 may be placed instead of the third collecting lens 178.

In one embodiment, the fourth to sixth embodiments as stated above may include the fluorescence wheel unit 400 according to the third embodiment instead of the fixed phosphor 200 that is a fluorescence emitting unit. In one embodiment, the fourth to sixth embodiments as stated above may include the configuration corresponding to the rotary wheel 501 described referring to FIG. 10 and FIG. 11. Specifically, the filter region 604, 704 in the fourth embodiment and the fifth embodiment may have a third filter region on the same face as the first filter region 604a and the second filter region 604b, where the third filter region reflects yellow wavelength band light and transmits blue, green, and red wavelength band light. In the sixth embodiment, the filter region 804 may have a third filter region similar to the third filter region 504c on the same face as the first filter region and the second filter region, where the third filter region transmits yellow wavelength band light and reflects blue, green, and red wavelength band light.

The present disclosure provides a light source device capable of reducing color irregularities while having a compact size, and a projector including this light source device.

The above embodiments are just for illustration of the present invention, and are not intended to limit the present invention to them. These novel embodiments can be embodied in other various forms, and various omissions, replacement and modifications can be added without deviating from the gist of the invention. These embodiments and their modifications are covered by the scope of the invention and its gist, and are covered by the scope of the invention recited in the following claims and their equivalents.

What is claimed is:

1. A light source device comprising:
an excitation light irradiation unit that emits excitation light;
a rotary wheel unit including a rotary wheel having a filter region that reflects or transmits light in a predetermined wavelength band different from a wavelength band of the excitation light and transmits the excitation light, and a transmission bending region that bends and transmits the excitation light; and
a fluorescence emitting unit that is irradiated with the excitation light transmitted through the filter region and emits fluorescence including light in the predetermined wavelength band toward the filter region,
wherein:
the rotary wheel unit is configured so that an optical axis of the excitation light that is transmitted through the rotary wheel or is reflected from the rotary wheel overlaps with an optical axis of the fluorescence in the predetermined wavelength band reflected from the filter region or transmitted through the filter region,
the filter region is located in a region of the rotary wheel that is different from the transmission bending region, and reflects the fluorescence in the predetermined wavelength band, and
the rotary wheel unit is configured so that an optical axis of the excitation light that is transmitted through the transmission bending region overlaps with an optical axis of the fluorescence in the predetermined wavelength band reflected from the filter region.

2. The light source device according to claim 1, wherein the excitation light irradiation unit is located opposite of the fluorescence emitting unit relative to plate faces of the rotary wheel.

3. The light source device according to claim 1, further comprising a light guide member that guides the excitation light transmitted through the rotary wheel to the fluorescence emitting unit.

4. The light source device according to claim 1, wherein the rotary wheel is disposed at an angle inclined to a face of the fluorescence emitting unit containing a fluorescence emission region.

5. The light source device according to claim 1, wherein the rotary wheel has a transmission diffusion region that diffuses and transmits the excitation light transmitted through the rotary wheel.

6. The light source device according to claim 1, further comprising a diffraction grating in the transmission bending region to diffract the excitation light.

7. The light source device according to claim 1, further comprising a refractive member in the transmission bending region, the refractive member having an inclined face that refracts the excitation light.

8. A projector comprising:
the light source device according to claim 1;
a display device configured to generate image light;
projection optics configured to project the image light emitted from the display device on a projecting target; and
a controller configured to control the light source device and the display device.

9. A light source device comprising:
an excitation light irradiation unit that emits excitation light;
a rotary wheel unit including a rotary wheel having a filter region that reflects or transmits light in a predetermined wavelength band different from a wavelength band of the excitation light and transmits the excitation light, and a transmission bending region that bends and transmits the excitation light; and
a fluorescence emitting unit that is irradiated with the excitation light transmitted through the filter region and emits fluorescence including light in the predetermined wavelength band toward the filter region,
wherein:
the rotary wheel unit is configured so that an optical axis of the excitation light that is transmitted through the rotary wheel or is reflected from the rotary wheel overlaps with an optical axis of the fluorescence in the predetermined wavelength band reflected from the filter region or transmitted through the filter region,
the rotary wheel includes an excitation light transmission region located in a region of the rotary wheel that is different from the transmission bending region, and transmits the excitation light,
the filter region is located on a face of the rotary wheel opposite a face of the rotary wheel on which the transmission bending region is provided and in a region corresponding to the transmission bending region, and reflects the fluorescence in the predetermined wavelength band, and the rotary wheel unit is configured so that an optical axis of the excitation light that is transmitted through the excitation light transmission region overlaps with an optical axis of the fluorescence in the predetermined wavelength band reflected from the filter region.

10. The light source device according to claim 9, wherein the rotary wheel is disposed at an angle inclined to a face of the fluorescence emitting unit containing a fluorescence emission region.

11. The light source device according to claim 9, wherein the excitation light irradiation unit is located opposite of the fluorescence emitting unit relative to plate faces of the rotary wheel.

12. The light source device according to claim 9, further comprising a diffraction grating in the transmission bending region to diffract the excitation light.

13. The light source device according to claim 9, further comprising a refractive member in the transmission bending region, the refractive member having an inclined face that refracts the excitation light.

14. A projector comprising:
the light source device according to claim 9;
a display device configured to generate image light;
projection optics configured to project the image light emitted from the display device on a projecting target; and
a controller configured to control the light source device and the display device.

15. A light source device comprising:
an excitation light irradiation unit that emits excitation light;
a rotary wheel unit including a rotary wheel having a filter region that reflects or transmits light in a predetermined wavelength band different from a wavelength band of the excitation light and transmits the excitation light, and a transmission bending region that bends and transmits the excitation light; and
a fluorescence emitting unit that is irradiated with the excitation light transmitted through the filter region and emits fluorescence including light in the predetermined wavelength band toward the filter region,
wherein:
the rotary wheel unit is configured so that an optical axis of the excitation light that is transmitted through the rotary wheel or is reflected from the rotary wheel overlaps with an optical axis of the fluorescence in the predetermined wavelength band reflected from the filter region or transmitted through the filter region,
the rotary wheel includes an excitation light reflecting region located in a region of the rotary wheel that is different from the transmission bending region, and reflects the excitation light,
the filter region is located on a face of the rotary wheel opposite a face of the rotary wheel on which the transmission bending region is provided and in a region corresponding to the transmission bending region, and transmits the fluorescence in the predetermined wavelength band, and
the rotary wheel unit is configured so that an optical axis of the excitation light that is reflected from the excitation light reflecting region overlaps with an optical axis of the fluorescence in the predetermined wavelength band transmitted through the filter region.

16. The light source device according to claim 15, wherein the rotary wheel is disposed at an angle inclined to a face of the fluorescence emitting unit containing a fluorescence emission region.

17. The light source device according to claim 15, wherein the excitation light irradiation unit is located opposite of the fluorescence emitting unit relative to plate faces of the rotary wheel.

18. The light source device according to claim 15, further comprising a diffraction grating in the transmission bending region to diffract the excitation light.

19. The light source device according to claim 15, further comprising a refractive member in the transmission bending region, the refractive member having an inclined face that refracts the excitation light.

20. A projector comprising:
the light source device according to claim 15;
a display device configured to generate image light;
projection optics configured to project the image light emitted from the display device on a projecting target; and
a controller configured to control the light source device and the display device.

* * * * *